(12) United States Patent
Matsumoto et al.

(10) Patent No.: US 10,131,422 B2
(45) Date of Patent: Nov. 20, 2018

(54) AIRCRAFT

(71) Applicant: Panasonic Intellectual Property Management Co., Ltd., Osaka (JP)

(72) Inventors: Hiroyuki Matsumoto, Osaka (JP); Shigenori Ichimura, Chiba (JP); Tatsuya Iyobe, Tochigi (JP); Mizuki Takita, Chiba (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 219 days.

(21) Appl. No.: 15/062,871

(22) Filed: Mar. 7, 2016

(65) Prior Publication Data

US 2017/0029097 A1 Feb. 2, 2017

(30) Foreign Application Priority Data

Jul. 31, 2015 (JP) ................................ 2015-152301
Sep. 3, 2015 (JP) ................................ 2015-173373
Jan. 29, 2016 (JP) ................................ 2016-016117

(51) Int. Cl.
| | |
|---|---|
| *B64B 1/26* | (2006.01) |
| *B64C 27/00* | (2006.01) |
| *B64B 1/58* | (2006.01) |
| *B64B 1/14* | (2006.01) |
| *B64B 1/40* | (2006.01) |

(Continued)

(52) U.S. Cl.
CPC .............. *B64C 27/006* (2013.01); *B64B 1/14* (2013.01); *B64B 1/26* (2013.01); *B64B 1/40* (2013.01); *B64B 1/58* (2013.01); *B64C 27/20* (2013.01); *B64C 39/024* (2013.01); *B64D 47/04* (2013.01); *B64D 47/08* (2013.01); *B64C 2201/022* (2013.01); *B64C 2201/027* (2013.01); *B64C 2201/042* (2013.01); *B64C 2201/101* (2013.01);

(Continued)

(58) Field of Classification Search
CPC ....... B64B 1/26; B64B 1/34; B64C 2201/101; B64C 2201/108
See application file for complete search history.

(56) References Cited

U.S. PATENT DOCUMENTS

| | | | | |
|---|---|---|---|---|
| 1,778,273 | A | * 10/1930 | Park ........................ | B64B 1/00 244/29 |
| 3,450,374 | A | * 6/1969 | Moore ..................... | B64B 1/00 101/91 |

(Continued)

FOREIGN PATENT DOCUMENTS

| | | |
|---|---|---|
| JP | S39-30617 Y | 10/1964 |
| JP | S53-102599 A | 9/1978 |

(Continued)

OTHER PUBLICATIONS

Office Action issued in corresponding Japanese Patent Application No. 2016-172644, dated Jul. 18, 2017 with English Translation.

(Continued)

*Primary Examiner* — Philip J Bonzell
(74) *Attorney, Agent, or Firm* — McDermott Will & Emery LLP

(57) ABSTRACT

An aircraft includes: a plurality of rotor units each including a propeller and a motor that drives the propeller; and a shock absorber covering the entire vertical length of lateral sides of the plurality of rotor units.

19 Claims, 18 Drawing Sheets

(51) Int. Cl.
*B64C 27/20* (2006.01)
*B64C 39/02* (2006.01)
*B64D 47/04* (2006.01)
*B64D 47/08* (2006.01)

(52) U.S. Cl.
CPC .. *B64C 2201/108* (2013.01); *B64C 2201/127* (2013.01); *B64D 2203/00* (2013.01)

(56) References Cited

U.S. PATENT DOCUMENTS

| | | | | |
|---|---|---|---|---|
| 3,993,268 | A | * | 11/1976 | Moore ............... B64C 1/34 244/119 |
| 4,114,837 | A | * | 9/1978 | Pavlecka ............ B64B 1/34 244/125 |
| 4,685,640 | A | * | 8/1987 | Warrington ........ B64B 1/00 244/23 C |
| 5,071,090 | A | | 12/1991 | Takahashi et al. |
| 5,071,383 | A | | 12/1991 | Kinoshita |
| 6,955,324 | B2 | * | 10/2005 | Tanielian ........... B64C 39/024 244/3.13 |
| 8,536,501 | B2 | * | 9/2013 | Tanielian ........... B64C 39/024 244/3.13 |
| 9,529,086 | B2 | * | 12/2016 | Taoka ................. G01N 15/06 |
| 2005/0096800 | A1 | * | 5/2005 | Tanielian ........... B64C 39/024 701/2 |
| 2005/0103943 | A1 | * | 5/2005 | Tanielian ........... B64C 39/024 244/190 |
| 2015/0290348 | A1 | * | 10/2015 | Taoka ................. A61L 9/22 422/22 |
| 2015/0293227 | A1 | * | 10/2015 | Taoka ................. G01N 15/06 356/338 |
| 2017/0253325 | A1 | * | 9/2017 | Zou .................... B64C 27/006 |

FOREIGN PATENT DOCUMENTS

| | | |
|---|---|---|
| JP | H03-092500 A | 4/1991 |
| JP | 04-022386 A | 1/1992 |
| JP | H05-008798 A | 1/1993 |
| JP | 2004-042824 A | 2/2004 |
| JP | 2006-197975 A | 8/2006 |
| JP | 2010-208501 | 9/2010 |
| JP | 2011-046355 A | 3/2011 |
| JP | 2013-189036 A | 9/2013 |
| JP | 2014-227016 | 12/2014 |
| JP | 2015-117003 A | 6/2015 |
| WO | 2006/112578 A1 | 10/2006 |
| WO | WO-2006112578 A1 * | 10/2006 ............ B64C 27/20 |

OTHER PUBLICATIONS

Office Action issued in corresponding Japanese Patent Application No. 2016-172645, dated Jul. 18, 2017 with English Translation.
Office Action issued in corresponding Japanese Patent Application No. 2016-172646, dated Jul. 18, 2017 with English Translation.
International Search Report of PCT application No. PCT/JP2016/003462 dated Oct. 18, 2016.
Japanese Office Action issued in Application No. 2016-016117 dated Jul. 19, 2016.
Japanese office action issued in Application No. 2016-172645 dated Feb. 13, 2018.

* cited by examiner

AIRCRAFT

CROSS REFERENCE TO RELATED APPLICATIONS

The present application is based on and claims priority of Japanese Patent Application No. 2015-152301 filed on Jul. 31, 2015, Japanese Patent Application No. 2015-173373 filed on Sep. 3, 2015, and Japanese Patent Application No. 2016-016117 filed on Jan. 29, 2016. The entire disclosures of the above-identified applications, including the specifications, drawings and claims are incorporated herein by reference in their entirety.

BACKGROUND

1. Field

The present disclosure relates to an aircraft including a plurality of rotor units.

2. Description of the Related Art

Japanese Unexamined Patent Application Publication No. 2011-046355 discloses an aircraft, including a plurality of rotor units each including a propeller. This type of aircraft is known as a multicopter or drone.

Japanese Unexamined Patent Application Publication No. 04-022386 discloses an aircraft including a buoyant body filled with helium gas and a single rotor unit including a propeller. The buoyant body of this aircraft is donut shaped, and the single rotor unit is disposed in the hole defined by the donut shape of the buoyant body.

SUMMARY

The rotor units of the aircraft disclosed in Japanese Unexamined Patent Application Publication No. 2011-04635 are exposed. The aircraft disclosed in Japanese Unexamined Patent Application Publication No. 04-022386 achieves flight with a single rotor unit including a large propeller. The aircraft therefore includes, extending outward beyond the buoyant body, legs for supporting the weight of rotor unit when landing and fins for controlling flight direction. Thus, when these aircrafts contact an object mid-flight, parts necessary to achieve flight such as rotor units and fins may be damaged, which may result in loss of ability to maintain stable aircraft flight.

The present disclosure has been conceived in view of the above concerns, and has an object to maintain stable flight of an aircraft even when the aircraft contacts a person or object mid-flight.

One aspect of the present disclosure provides an aircraft including: a plurality of rotor units each including a propeller and a motor that drives the propeller; and a shock absorber covering the entire vertical length of a lateral side of the plurality of rotor units.

The aircraft according to one aspect of the present disclosure is capable of maintaining stable flight even when the aircraft contacts a person or object mid-flight.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF EMBODIMENTS

Hereinafter, non-limiting embodiments will be described in detail with reference to the accompanying drawings, but unnecessarily detailed descriptions may be omitted. For example, detailed descriptions of well-known matters or descriptions of components that are substantially the same as components described previous thereto may be omitted. This is to avoid redundancy and provide easily read descriptions for those skilled in the art.

Note that the inventors have provided the accompanying drawings and following detailed description in order for those skilled in the art to fully understand the present disclosure; the accompanying drawings and following detailed description are not intended to limit the scope of the accompanying claims.

Embodiment 1

Aircraft Schematic Framework

Hereinafter aircraft 10 according to Embodiment 1 will be described.

Figure 1:
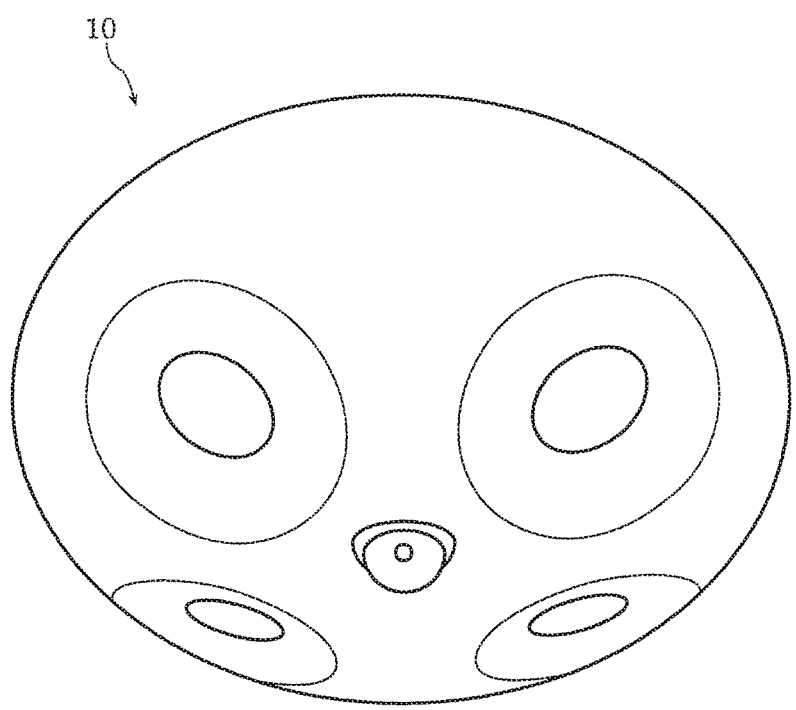
FIG. 1 is a perspective view of the bottom of an aircraft according to Embodiment 1.
Figure 2:
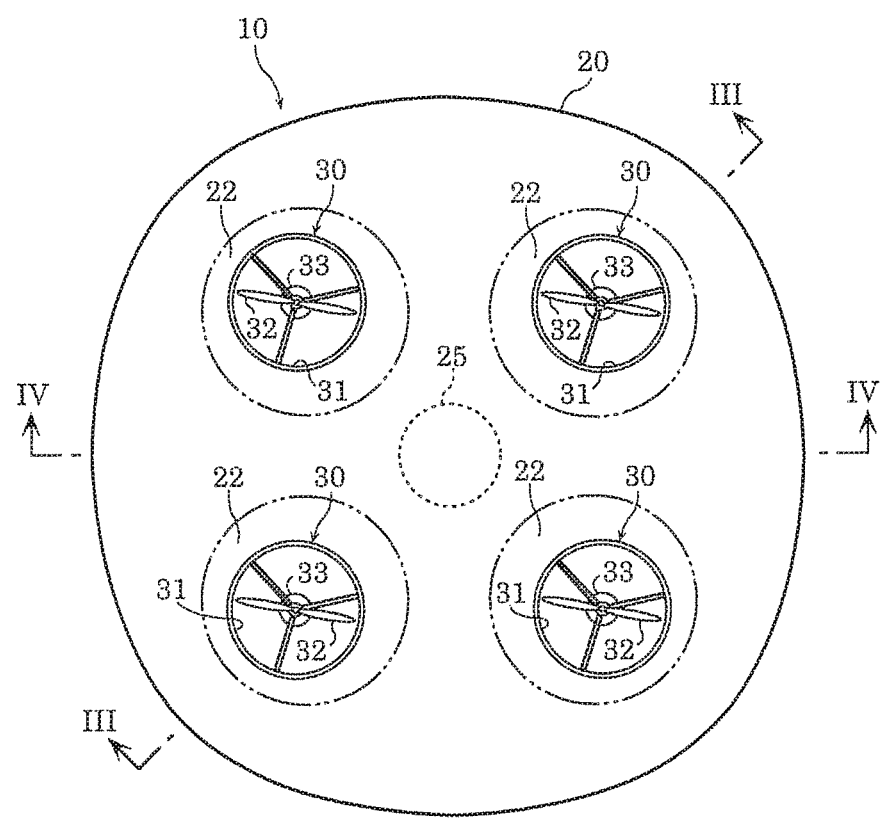
FIG. 2 is a plan view of the aircraft according to Embodiment 1.
Figure 3:
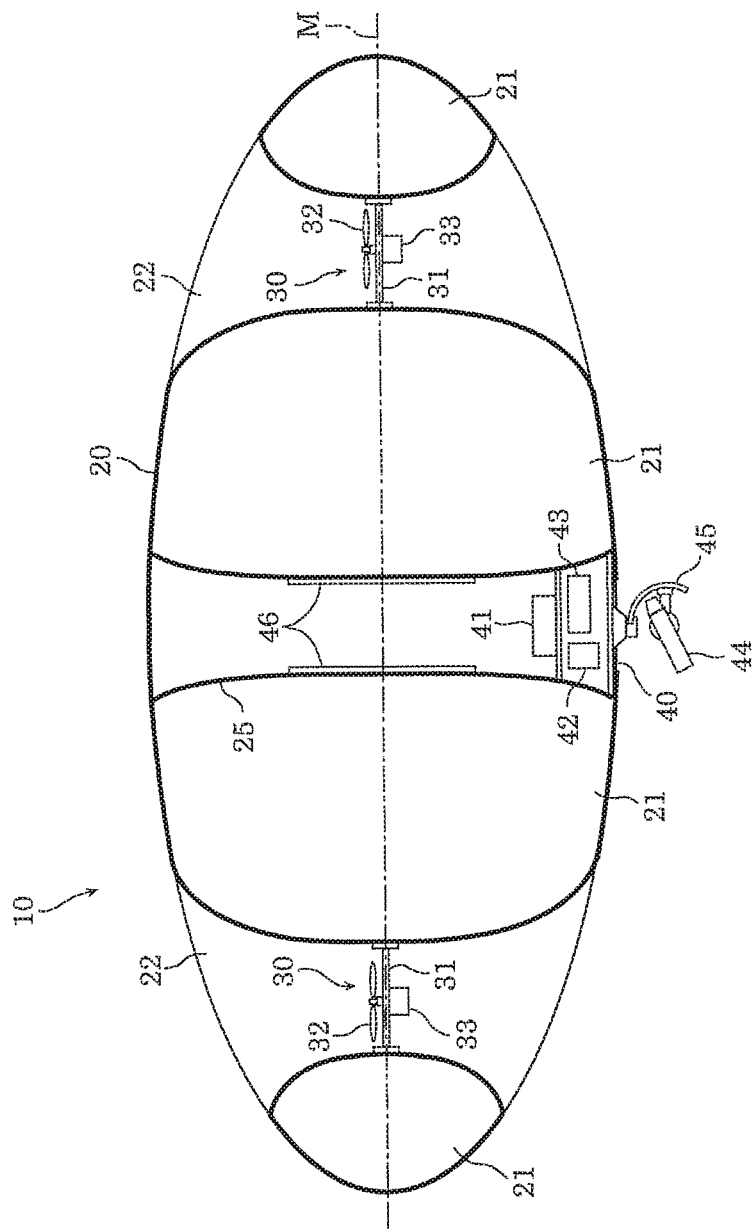
FIG. 3 is a cross sectional view of the aircraft taken at line III-III in FIG. 2.
Figure 4:
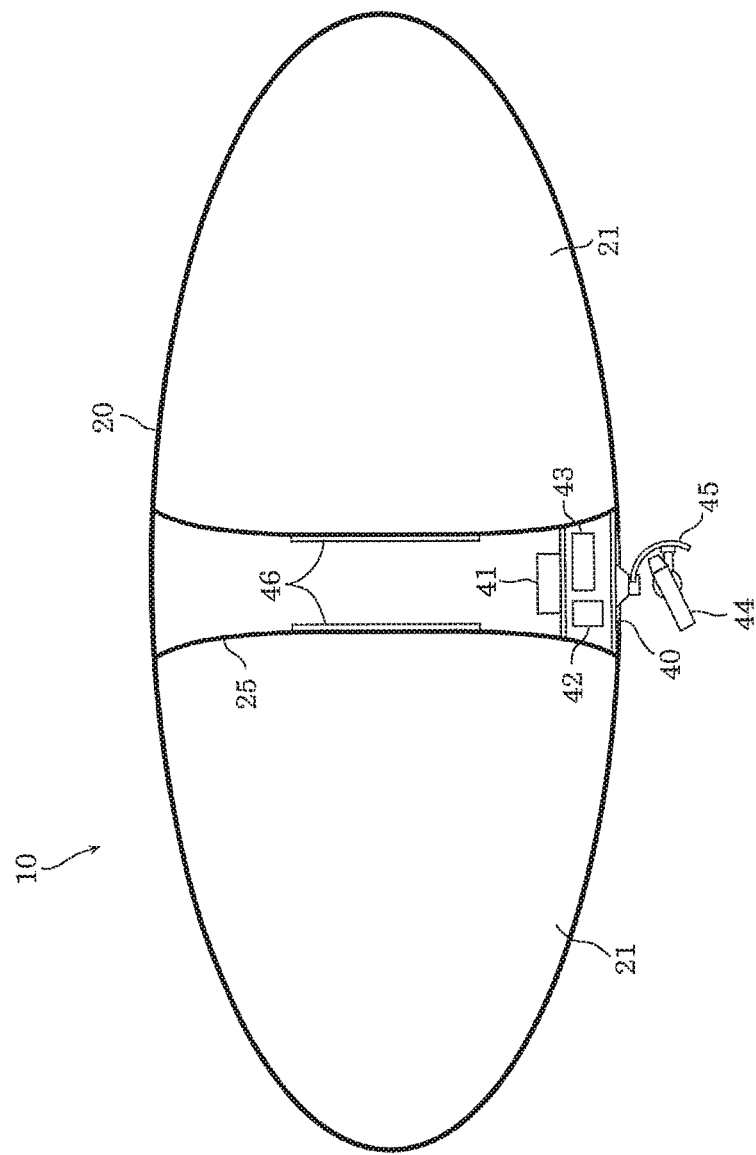
FIG. 4 is a cross sectional view of the aircraft taken at line IV-IV in FIG.

FIG. 1 is a perspective view of the bottom of the aircraft according to Embodiment 1. FIG. 2 is a plan view of the aircraft according to Embodiment 1. FIG. 3 is a cross sectional view of the aircraft taken at line III-III in FIG. 2. FIG. 4 is a cross sectional view of the aircraft taken at line IV-IV in FIG. 2.

As illustrated in FIG. 1 and FIG. 2, aircraft 10 according to Embodiment 1 includes a single balloon 20 as the shock absorber and four rotor units 30. Aircraft 10 also includes controller 41, battery 42, projector 43, and camera 44 as onboard devices, as illustrated in FIG. 3 and FIG. 4. Aircraft 10 further includes luminous body 46.

Balloon

Next, balloon 20 will be described.

Figure 5:
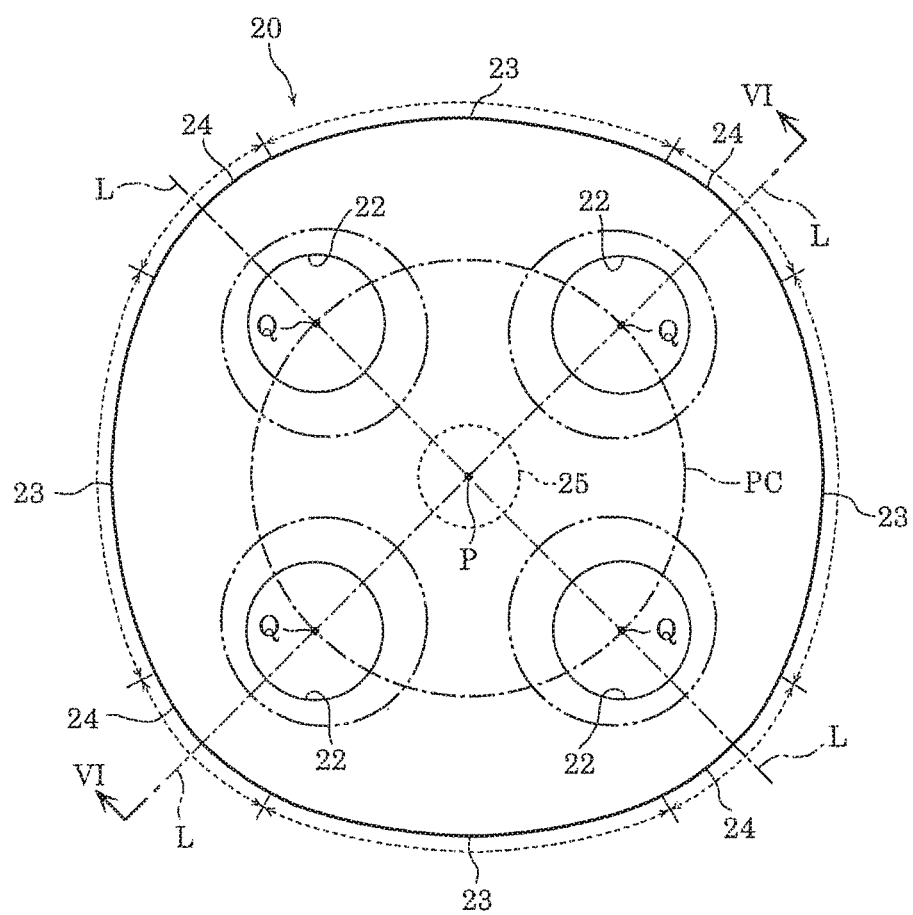
FIG. 5 is a plan view of a balloon according to Embodiment 1.
Figure 6:
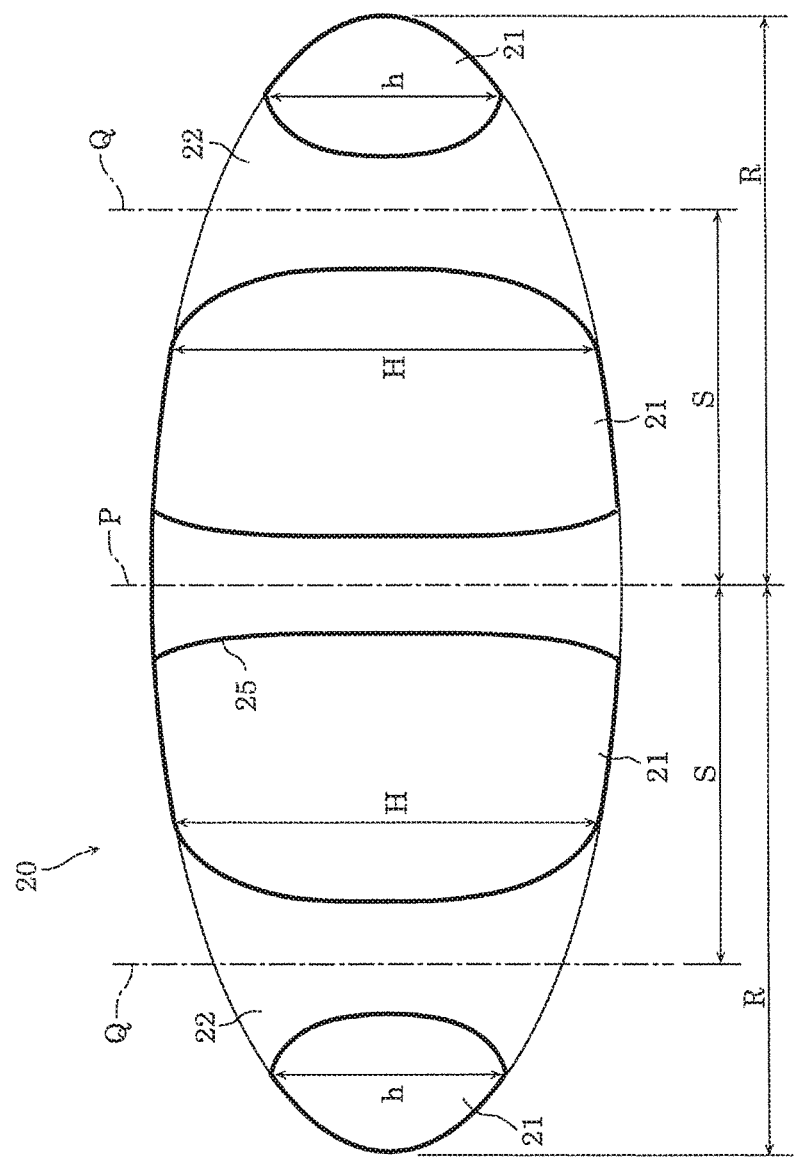
FIG. 6 is a cross sectional view of the balloon taken at line VI-VI in FIG. 5.

FIG. 5 is a plan view of the balloon according to Embodiment 1. FIG. 6 is a cross sectional view of the balloon taken at line VI-VI in FIG. 5.

As illustrated in FIG. 3, FIG. 4, and FIG. 6, balloon 20 is made of a flexible material (for example, vinyl chloride) formed in a sheet, and includes gas chamber 21, which is a space enclosed by the sheet. In FIG. 3, FIG. 4, and FIG. 6, the bold lines indicate the cross section of the sheet forming balloon 20. The material of the sheet forming the outer surface of balloon 20 is white in color and semitransparent so as to allow light to pass through. Gas chamber 21 formed by the sheet is filled with gas for providing buoyancy, such as helium. Gas filling gas chamber 21 may be gas that is less dense than the atmosphere.

As illustrated in FIG. 5, balloon 20 has rotational symmetry about a vertically extending line. This axis of symmetry is central axis P of balloon 20. Balloon 20 illustrated in FIG. 5 has a rotational symmetry of 90 degrees. In other words, balloon 20 has the same shape after each 90 degree rotation about central axis P.

As illustrated in FIG. 6, balloon 20 has a low profile. When viewed from the side, balloon 20 has a streamlined shape. Balloon 20 gradually decreases in height from its central region toward its peripheral edge. More specifically, in a cross section of balloon 20 taken along central axis P illustrated in FIG. 6, balloon 20 has an elliptical shape whose major axis extends horizontally and minor axis extends vertically. Stated differently, balloon 20 has a cross sectional shape that is essentially symmetrical about its horizontal axis. Note that the cross section of balloon 20 is not required to be an ellipse formally defined by focus points; balloon 20 may have a cross sectional shape that would generally be recognized as an ellipse at a glance.

Balloon 20 includes as many ventilation holes 22 as it does rotor units 30 (in this embodiment, balloon 20 includes four). As illustrated in FIG. 6, each ventilation hole 22 is a passageway having an approximately circular cross section and passes through balloon 20 in a vertical direction. Central axis Q of each ventilation hole 22 is approximately parallel to central axis P of balloon 20.

As illustrated in FIG. 6, central axis Q of each ventilation hole 22 is located between (i) a center point between central axis P of balloon 20 and the peripheral edge of balloon 20 and (ii) the peripheral edge of balloon 20. More specifically, the distance S between central axis P of balloon 20 and central axis Q of ventilation hole 22 is longer than half of the distance fi between central axis P of balloon 20 and the peripheral edge of balloon 20 (S>R/2). Thus, rotor units 30 are located closer the peripheral edge of balloon 20 than central axis P of balloon 20. Arranging rotor units 30 in this manner makes it possible to secure enough space between rotor units 30 and stably fly aircraft 10.

The smallest cross sectional area of each ventilation hole 22 is located in the vertical central region of ventilation hole 22 (i.e., the area of a cross section taken perpendicular to central axis Q is smallest in the central region of ventilation hole 22). Each ventilation hole 22 has a shape that gradually expands in cross sectional area from the vertical central region toward the top end and from the vertical central region toward the bottom end. Stated differently, each ventilation hole 22 has the shape of a pillar with a pinched midsection. As described above, balloon 20 gradually decreases in height from its central region toward its peripheral edge. As such, with respect to each ventilation hole 22, the height h measured closer to the peripheral edge of balloon 20 is less than the height H measured closer to the central region of balloon 20.

As illustrated in FIG. 5, four ventilation holes 22 are arranged at 90 degree intervals around central axis P of balloon 20. Central axes Q of ventilation holes 22 are equidistant from central axis P of balloon 20. Stated differently, Central axis Q of each ventilation hole 22 is approximately orthogonal to one pitch circle PC centered about central axis P of balloon 20.

As illustrated in FIG. 5, in a top view, the peripheral edge of balloon 20 consists of reference curve sections 23 and small curvature radius sections 24. There are as many reference curve sections 23 as there are ventilation holes 22, and as many small curvature radius sections 24 as there are ventilation holes 22 (in this embodiment, four each). Reference curve sections 23 and small curvature radius sections 24 are alternately arranged around the peripheral edge of balloon 20 in a top view. Small curvature radius sections 24 are located adjacent to ventilation holes 22 in one-to-one correspondence. Moreover, each small curvature radius section 24 is located in a more peripheral position than its adjacent ventilation hole 22 (i.e., located across ventilation hole 22 from central axis P of balloon 20). Each reference curve section 23 is disposed between two adjacent small curvature radius sections 24.

Reference curve sections 23 and small curvature radius sections 24 are both curved. The midpoint of the length (in the circumference direction) of each small curvature radius section 24 is located on line L that intersects central axis Q of the closest ventilation hole 22 as well as central axis P of balloon 20 at a right angle.

The radius of curvature of each small curvature radius section 24 is smaller than the radius of curvature of each reference curve section 23. However, the curvature of each reference curve section 23 is not required to be constant across the entire length thereof. Moreover, the curvature of each small curvature radius section 24 is not required to be constant across the entire length thereof. When the curvatures of reference curve sections 23 and small curvature radius sections 24 are not constant, the maximum radius of curvature of small curvature radius section 24 is simply required to be less than the maximum radius of curvature of reference curve section 23.

As illustrated in FIG. 6, balloon 20 includes a tubular connector 25. Connector 25 is made of sheet-like light-transmissive material formed in the shape of a cylinder (or round tube) whose top and bottom end portions have a slightly increased diameter. Connector 25 is disposed such that its central axis is approximately coaxial with central axis P of balloon 20. In balloon 20, the top end of connector 25 is connected to the top portion of balloon 20 and the bottom end of connector 25 is connected to the bottom portion of balloon 20.

The top end of the tubular connector 25 is sealed, whereas the bottom end is open. The space inside connector 25 is therefore in communication with the space external to balloon 20. Air is present in the space inside connector 25, and the pressure inside the space is approximately equal to the atmospheric pressure.

As described above, balloon 20 has rotational symmetry about the vertically extending central axis P. The gas filling gas chamber 21 of balloon 20, such as helium, is evenly spread throughout gas chamber 21. As such, the working point, of the buoyant force (i.e., the center of buoyancy)

exerted by the gas filling balloon 20 is located approximately above central axis P of balloon 20.

The inner volumetric capacity of balloon 20 (i.e., the volumetric capacity of gas chamber 21) is determined such that the buoyant force of the gas filling balloon 20 is slightly less than the gross weight of aircraft 10. Thus, aircraft 10 slowly descends when rotor unit 30 stops mid-air.

Rotor Unit

Next, rotor unit 30 will be described.

As illustrated in FIG. 2 and FIG. 3, each rotor unit 30 includes one each of frame 31, propeller 32, and motor 33.

Frame 31 includes a ring-shaped part and a spoke-shaped part extending from the center of frame 31 toward the ring-shaped part. Motor 33 is attached to the central region of frame 31. Propeller 32 is attached to the output shaft of motor 33. The axis of rotation of the output shaft of motor 33 (i.e., the axis of rotation of propeller 32) and the central axis of frame 31 are approximately coaxial. Note that propeller 2 includes a single propeller, but propeller 32 may include two propellers that rotate in opposite directions about the same axis of rotation contra-rotating propellers).

A single rotor unit 30 is disposed in each ventilation hole 22. Each rotor unit 30 is disposed such that the axis of rotation of propeller 32 is approximately vertical. The axis of rotation of propeller 32 and the central axis Q of ventilation hole 22 are approximately coaxial. Rotor units 30 are disposed in the vertical central regions of ventilation holes 22. Stated differently, rotor units 30 are disposed to overlap center plane M passing through the vertical center of balloon 20, as illustrated in FIG. 3. Center plane M is a plane located in the vertical center of balloon 20 and intersects central axis P of balloon 20 at a right angle. The outer diameter of frame 31 of rotor unit 30 is approximately equal to the inner diameter of vertical central region of ventilation hole 22.

Rotor units 30 are disposed in ventilation holes 22 such that the entire height of rotor unit 30 fits in ventilation hole 22. Stated differently, the lateral sides of each rotor unit 30 are covered by balloon 20 across the entire vertical length of rotor unit 30.

Note that "vertical" refers to when aircraft 10 is level, not tilted. Stated differently, "vertical" is substantially parallel to the axis of rotation of rotor unit 30.

Moreover, ventilation hole 22 more preferably has such a height that the distance from the vertical center of rotor unit 30 to the top of ventilation hole 22 and the distance from the vertical center of rotor unit 30 to the bottom of ventilation hole 22 are each greater than or equal to the radius of rotor unit 30. With this, even if the axis of rotation of propeller 32 of rotor unit 30 were to rotate 90 degrees relative to aircraft 10 as a result of, for example, rotor unit 30 experiencing an impact or rotor unit 30 malfunctioning, protrusion of rotor unit 30 out of ventilation hole 22 can be reduced. Thus, balloon 20 can cover the lateral sides of rotor unit 30 to a degree whereby rotor unit 30 cannot easily contact an object.

Onboard Device, Luminous Body, Etc.

As described above, aircraft 10 includes onboard devices, including controller 41, battery 42, projector 43, and camera 44. Aircraft 10 also includes luminous body 46.

As illustrated in FIG. 3, aircraft 10 includes disk 40. Disk 40 is a disk-shaped component approximately equal in diameter to the bottom end of connector 25, and is disposed so as to cover the bottom end of connector 25. Disk 40 may be made from a resin material such as polypropylene (PP), polycarbonate (PC), polybutylene terephthalate (PBT), and acrylonitrile butadiene styrene (ABS) resin, or from metal such as aluminum, copper, and stainless steel.

Camera 44, which is used for photography purposes, is attached to the bottom surface of disk 40 via gimbal 45. Camera 44 is designed to photograph images from above (i.e., in mid-air), and as such, is disposed facing downward at an angle. Gimbal 45 is a component for maintaining the orientation of camera 44 even when the orientation of aircraft 10 changes.

Controller 41, battery 42, and projector 43 are disposed above disk 40. Controller 41 receives command signals transmitted from a radio remote control, and controls rotor unit 30, camera 44, and projector 43 in accordance with the received command signals. Controller 41 also transmits images taken by camera 44, for example. Battery 42 supplies power to rotor unit 30, controller 41, projector 43, and luminous body 46. Projector 43 projects images on an inner surface of balloon 20 made of semi-transparent material.

Luminous body 46 is an LED light strip including an elongated flexible printed substrate and multiple light-emitting elements (such as LEDs) aligned in the lengthwise direction of the elongated flexible printed substrate in the vertical central region of connector 25, luminous body 46 is wound into a tubular helical coil such that the LEDs face outward. In other words, luminous body 46 covers the inside surface of connector 25. As such, luminous body 46 is subjected to the pressure inside gas chamber 21 acting on connector 25, and the space inside connector 25 is maintained at a predetermined tubular shape. Stated differently, from inside connector 25, luminous body 46 restricts inward movement of connector 25 so that connector 25 does not become narrower than a predetermined tubular shape. As described above, connector 25 is made of a light transmissive material. As such, light emitted from luminous body 46 passes through connector 25 and strikes the inner surface of balloon 20, which is made of semi-transparent material.

Note that luminous body 46 is exemplified as an LED light strip wound into a tubular helical coil, but luminous body 46 is not limited to this example. For example, luminous body 46 include a tubular component and light-emitting elements which are separate components from the tubular component. Stated differently, a tubular luminous body can be achieved by combining a tubular component and substrates on which LEDs are mounted.

Aircraft Flying Orientation

As described above, with aircraft 10, onboard devices such as controller 41 and battery 42 are disposed at the bottom end portion of the space inside connector 25. Stated differently, the relatively heavy onboard devices are concentrated in the bottom part of aircraft 10. As a result, the overall center of gravity of aircraft 10 is positioned lower than the working point of the buoyant force exerted by the gas filling balloon 20. Consequently, even when rotor unit 30 stalls, aircraft 10 does not rotate about its roll or pitch axes and can thus maintain the downward orientation of camera 44.

Moreover, the relatively heavy onboard devices are installed below rotor unit 30. As a result, the overall center of gravity of aircraft 10 is positioned lower than the working point of the buoyant force resulting from rotor unit 30 running. Consequently, even when rotor unit 30 is running, aircraft 10 can maintain the downward orientation of camera 44.

Aircraft 10 includes a plurality of rotor units 30. This allows aircraft 10 to increase propulsion in a horizontal direction when aircraft 10 moves in a substantially horizontal direction by increasing the rotational speed of rotor unit 30 located further in the opposite direction of travel to a speed greater than the rotational speed of rotor unit 30 located further in the direction of travel.

Advantageous Effects of Embodiment 1

Aircraft 10 according to Embodiment 1 includes: a plurality of rotor units 30 each including propeller 32 and motor 33 that drives propeller 32; and balloon 20 as a shock absorber covering an entire vertical length of a lateral side of the plurality of rotor units 30.

With aircraft 10, since the lateral sides of rotor unit 30 are covered by balloon 20 across the entire vertical length of rotor units 30, if aircraft 10 contacts an object mid-flight, balloon 20 will contact the object instead of rotor units 30. Stated differently, even if aircraft 10 contacts an object mid-flight, contact between rotor units 30 and the object can be avoided. Thus, according to Embodiment 1, even if aircraft 10 contacts an object mid-flight, damage to rotor units 30 resulting from the contact can be prevented and stable flight of aircraft 10 can be maintained.

Moreover, if aircraft 10 were to crash into the ground, the gas-filled balloon 20 would contact the ground and deform, thereby softening the impact. As such, Embodiment 1 can prevent damage to rotor unit 30 resulting from a crash. Moreover, even if aircraft 10 were to crash into the ground, since the gas-filled balloon 20 would contact the object rather than rotor unit 30 or onboard device, damage to the object from contact with aircraft 10 can be reduced.

Moreover, spaces filled with gas such as helium are formed in balloon 20 in regions between rotor units 30 in addition to in a region surrounding all rotor units 30 disposed in predetermined locations. Thus, with Embodiment 1, sufficient inner volumetric capacity can be secured in balloon 20, thereby reducing the need to increase the size of balloon 20.

Moreover, when aircraft 10 includes a plurality of rotor units 30, in order to stabilize flight of aircraft 10, the plurality of rotor units 30 are preferably spaced apart by a given distance. However, as described above, gas chambers filled with gas such as helium are also provided in regions between rotor units 30 with balloon 20 according to Embodiment 1. Thus, according to Embodiment 1, a sufficient gas chamber capacity can be secured without enlarging aircraft. 10, and sufficient distance between rotor units 30 can be secured. This makes it possible to stabilize flight of aircraft 10.

Moreover, in Embodiment 1, aircraft 10 flies using both the buoyant force of the gas filling balloon 20 and the buoyant force of air current generated by rotor units 30. As such, compared to when just the buoyant force resulting from rotor units 30 running is used, energy such as power needed to drive rotor units 30 can be saved, thereby increasing the flight time aircraft 10 is capable of.

Moreover, in Embodiment 1, balloon 20 has a low profile.

This low profile shape makes it less likely that aircraft 10 will tilt relative to the axis of symmetry (central axis P) of balloon 20 mid-flight, resulting in a more stable flight of aircraft 10.

Moreover, in Embodiment 1, rotor units 30 and ventilation holes 22 in which rotor units 30 are installed are located near the peripheral edge of balloon 20.

This makes it possible to secure sufficient distance between rotor units 30 in aircraft 10. Thus, with Embodiment 1, flight of aircraft 10 can be stabilized by securing sufficient distance between rotor units 30.

Moreover, in Embodiment 1, balloon 20 gradually decreases in height from its central region toward its peripheral edge.

This gives balloon 20 a streamlined shape when viewed from the side. Thus, with Embodiment 1, it is possible to reduce the resistance of aircraft 10 to air mid-flight. Moreover, when ventilation holes 22 are arranged at intervals of a predetermined angle about the vertically extending central axis of balloon 20, ventilation holes 22 are located at relatively slim portions of balloon 20, making it possible to keep the lengths of ventilation holes 22 relatively short. The shorter the lengths of ventilation holes 22, the less the loss in air pressure is as air passes through ventilation holes 22. Thus, in this case, a sufficient amount of air flow through ventilation holes 22 can be secured which makes it possible to secure sufficient propulsion by rotor units 30.

Moreover, in Embodiment 1, connector 25 is provided in the central region of balloon 20 with one end connected to the top portion of balloon 20 and the other end connected to the bottom portion of balloon 20.

Stated differently, the top portion and the bottom portion in the central region of balloon 20 are connected via connector 25. This makes it easier for balloon 20 to maintain a desirable shape, such as a low profile shape. When the shape of balloon 20 is stable, ventilation holes 22 formed in balloon 20 are also stable, making it possible to achieve actual ventilation holes 22 similar to their design shape. Thus, a sufficient amount of air flow through ventilation holes 22 can be secured which in turn makes it possible to secure sufficient propulsion by rotor units 30. Moreover, stabilizing the shape of ventilation holes 22 formed in balloon 20 makes it easier to approximately match the shapes of all ventilation holes 22. This further equalizes the amount of air flowing through ventilation holes 22, which stabilizes flight of aircraft 10.

Moreover, in Embodiment 1, connector 25 has a tubular shape.

As such, the central regions of the top and bottom portions of balloon 20 (i.e., the regions surrounding central axis P of balloon 20) are connected to one another via tubular connector 25, across the entire perimeter of the central regions. Thus, with Embodiment 1, it is further easier for balloon 20 to maintain a desirable shape.

Moreover, in Embodiment 1, the space inside connector 25 is in communication with the space external to balloon 20.

As such, air fills the space inside connector 25 rather than gas for exerting buoyant force, such as helium.

Moreover, in Embodiment 1, each ventilation hole 22 has a shape that gradually expands in cross sectional area from the vertical central region toward the top end and from the vertical central region toward the bottom end.

Giving ventilation holes 22 such a shape reduces a loss in air pressure as air flows into ventilation holes 22 and a loss in air pressure as air flows out of ventilation holes 22. As such, even when rotor units 30 generate little thrust, a sufficient amount of air flow through ventilation holes 22 can be secured which makes it possible to secure sufficient propulsion by rotor units 30. Thus, in order to obtain the same propulsion, the energy consumed by rotor unit 30 can be reduced.

Moreover, in Embodiment 1, balloon 20 gradually decreases in height from its central region toward its peripheral edge, and with respect to each ventilation hole 22, the height h measured near the peripheral edge of balloon 20 is less than the height measured near the central region of balloon 20.

With this, in each ventilation hole 22 in balloon 20, air flows into ventilation hole 22 from a direction originating from the peripheral edge of balloon 20 and exits ventilation hole 22 in a direction heading toward the peripheral edge of balloon 20. As a result, air flowing into one ventilation hole 22 can be inhibited from interfering with air flowing into another ventilation hole 22, and air flowing out of one ventilation hole 22 can be inhibited from interfering with air flowing out of another ventilation hole 22. Thus, with Embodiment 1, disruption of airflow due to interference of air flowing into and out of ventilation holes 22 can be inhibited, which stabilizes flight of aircraft 10.

Moreover, in Embodiment 1, rotor units 30 are disposed in the vertical central regions of ventilation holes 22. Stated differently, rotor units 30 are disposed to overlap center plane M passing through the vertical center of balloon 20.

As such, air flowing from the top of ventilation hole 22 toward rotor unit 30 and air flowing from rotor unit 30 toward the bottom of ventilation hole 22 can be stabilized, which stabilizes flight of aircraft 10.

Moreover, in Embodiment 1, ventilation holes 22 are arranged at intervals of a predetermined angle about the vertically extending central axis P of balloon 20.

Since rotor units 30 are therefore disposed at intervals of a predetermined angle about central axis P of balloon 20 and blow air downward, flight of aircraft 10 can be stabilized.

Moreover, in Embodiment 1, balloon 20 has rotational symmetry about a vertically extending line.

As such, the working point of the buoyant force of the gas filling balloon 20 is located on the axis of symmetry (i.e., central axis P) of balloon 20. As such, aircraft 10 can be inhibited from tilting mid-flight (here, tilt more specifically means change in orientation relative to central axis P of balloon 20), which stabilizes flight of aircraft 10.

Moreover, in Embodiment 1, reference curve sections 23, which are equal in number to ventilation holes 22, and small curvature radius sections 24, which are also equal in number to ventilation holes 22 and have a smaller radius of curvature than reference curve sections 23, are alternately arranged along the peripheral edge of balloon 20 in a top view. Each small curvature radius section 24 is located adjacent to one ventilation hole 22, in a more peripheral position than its adjacent ventilation hole 22.

Here, tension working in sections of the peripheral, edge of balloon 20 in a top view near ventilation holes 22 is lower than tension working in sections of the peripheral edge of balloon 20 in a top view further away from ventilation holes 22. This is because tension is working on portions of balloon 20 that form the walls of ventilation holes 22. When tension working on balloon 20 is regionally low, wrinkles easily form where working tension is low.

In light of this, in Embodiment it, the radius of curvature of sections of the peripheral edge of balloon 20 in a top view near ventilation holes 22 is less than the radius of curvature of sections of the peripheral edge of balloon 20 in a top view further from ventilation holes 22. As such, the difference between tension working in sections of the peripheral edge of balloon 20 in a top view near ventilation holes 22 and tension working in sections of the peripheral edge of balloon 20 in a top view further away from ventilation holes 22 can be reduced. Accordingly, with Embodiment 1, wrinkles can be kept from forming in balloon 20, and the aesthetics of balloon 20 can be maintained.

Moreover, in Embodiment 1, onboard devices are housed in the space inside connector 25. The housed onboard devices include at least controller 41 that controls rotor units 30 and battery 42 that supplies power to rotor units 30.

The space inside connector 25 is in communication with the space external to balloon 20. As such, gas for providing buoyancy, such as helium, can be kept from expelling from balloon 20, and maintenance such as changing of battery 42 disposed in the space inside connector 25 can be done.

Moreover, in Embodiment 1, onboard devices are disposed at the bottom end of the space inside connector 25.

As such, the center of gravity of aircraft 10 can be lowered, thereby stabilizing flight of aircraft 10.

Moreover, in Embodiment 1, connector 25 is light-transmissive and houses in the space therein luminous body 46.

In Embodiment 1, light emitted by luminous body 46 passes through the light-transmissive connector 25, whereby it is emitted outside of connector 25. As such, if the outer layer of balloon 20 is made of a semitransparent material, for example, light emitted by luminous body 46 will strike the inner surface of balloon 20, whereby the color of the entire balloon 20 can be changed to the color of light emitted by luminous body 46. Thus, with Embodiment 1, the color of balloon 20 can be changed mid-flight to easily achieve a dramatic effect, for example.

Note that in Embodiment 1, the gas filling gas chamber 21 is exemplified as a gas that provides buoyancy, such as helium, but if flight is achievable with the buoyant force exerted by rotor units 30 alone, gas filling gas chamber 21 may be a gas that does not provide buoyancy, such as air. In this case, the load placed on rotor units 30 increases since balloon 20 does not provide any buoyancy itself, but the ascent and descent speed of aircraft 10 is more controllable. Furthermore, costs incurred from using gas can be saved.

Embodiment 2

Hereinafter aircraft 10A according to Embodiment 2 will be described. Aircraft 10A according to Embodiment 2 is achieved by equipping rudders 34 in the bottom ends of ventilation holes 22 in aircraft 10 according to Embodiment 1.

Figure 7:
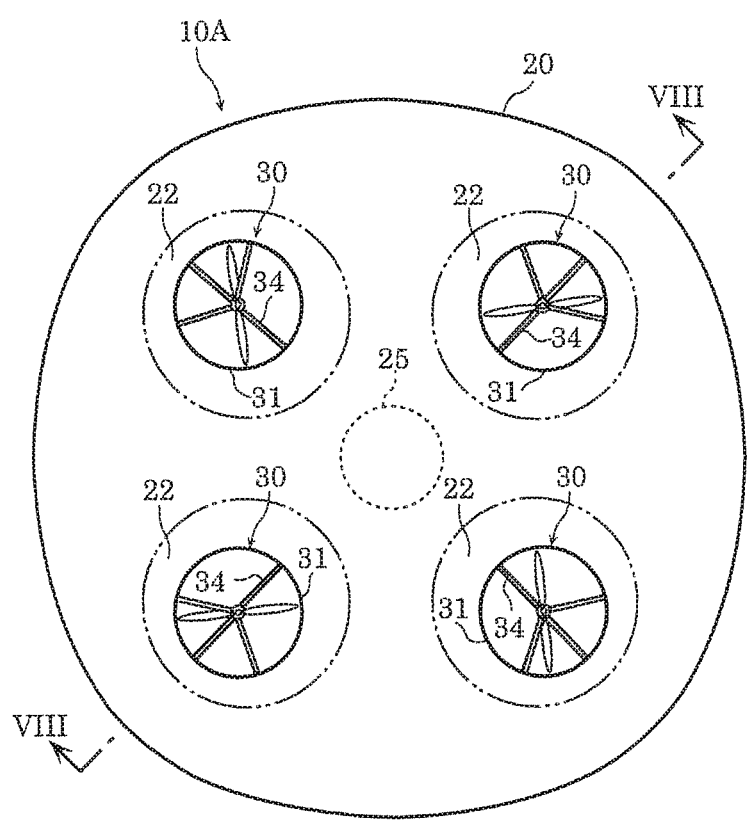
FIG. 7 is a plan view of an aircraft according to Embodiment 2.
Figure 8:
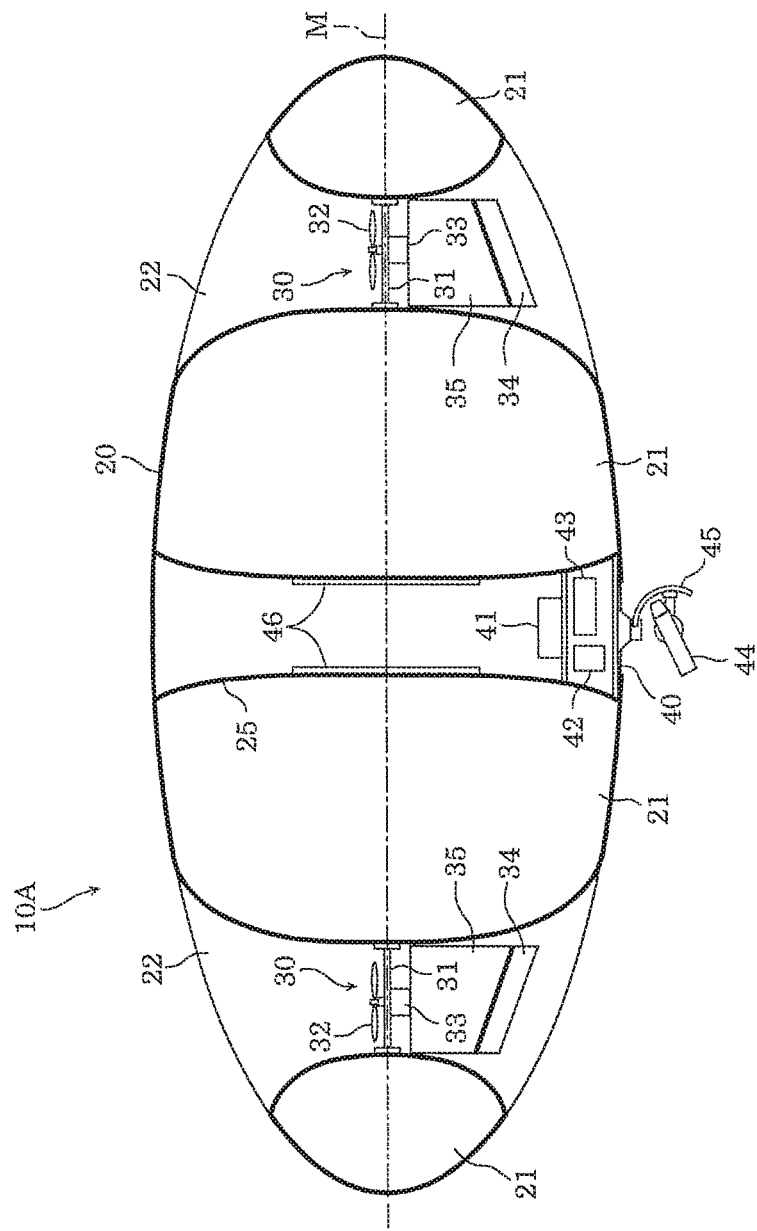
FIG. 8 is a cross sectional view of the aircraft taken at line VIII-VIII in FIG. 7.

As illustrated in FIG. 7 and FIG. 8, aircraft 10A according to Embodiment 2 includes, in addition to the components included in aircraft 10 according to Embodiment 1, rudders 34 and, flow conditioning; plates 35 in ventilation holes 22 in addition to rotor units 30.

FIG. 7 is a plan view of the aircraft according to Embodiment 2. FIG. 8 is a cross sectional view of the aircraft taken at line VIII-VIII in FIG. 7.

Figure 9:
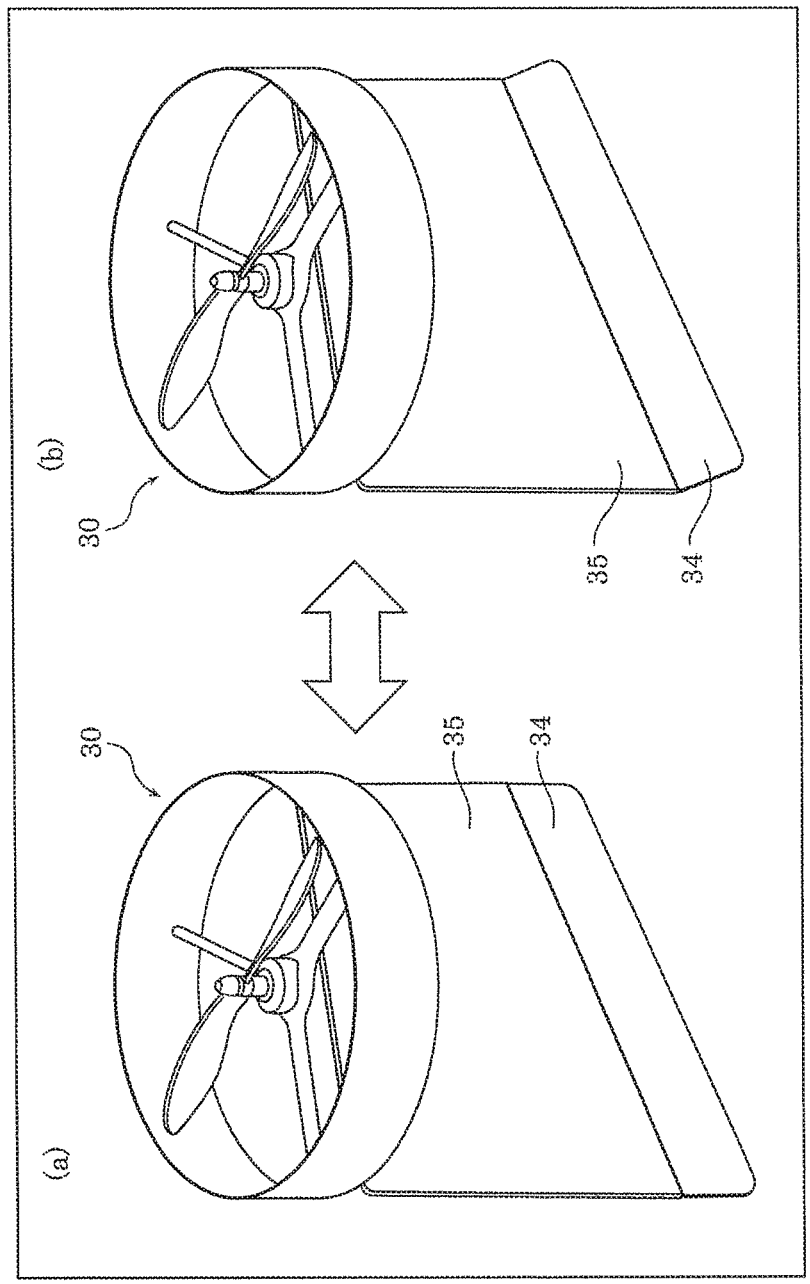
FIG. 9 is a perspective view inside a ventilation hole according to Embodiment 2.

Rudders 34 are disposed in the bottom ends of ventilation holes 22. Each rudder 34 is an elongated plate-shaped component, and in a top view of aircraft 10A, when in an unrotated reference orientation, is disposed approximately parallel to line PQ connecting central axis P of aircraft 10A and central axis Q of ventilation hole 22 in which rudder 34 is disposed. Each rudder 34 is disposed such that its inner short side located in a more inward position relative to aircraft 10A is positioned higher than its outer short side located in a more peripheral position relative to aircraft 10A. Moreover, each rudder 34 can move about an axis along its upper long side, as illustrated in FIG. 9. Here, approximately parallel to line PQ in a top view means within a range of −30 degrees to +30 degrees, inclusive, with respect to line PQ.

Flow conditioning plate 35 is disposed between rudder 34 and rotor unit 30 disposed in the vertical central region of ventilation hole 22. In the top view of aircraft 10A illustrated in FIG. 7, each flow conditioning plate 35 is arranged approximately parallel to line PQ, and divides the area of ventilation hole 22 in a horizontal plane into two approximately equal parts. Stated differently, in a top view, flow conditioning plate 35 is arranged in a position that passes through central axis Q of ventilation hole.

Rudders 34 are arranged in two ventilation holes 22 that have symmetry about the center of aircraft 10A. The orientation of aircraft 10A and horizontal rotation of aircraft 10A can be controlled by adjusting the angle or angles of a single rudder 34 or a pair of (two) rudders 34. Rudders 34 may be provided in all four ventilation holes 22, as illustrated in FIG. 7, and, alternatively, may be provided, in only two ventilation holes 22 aligned, in the direction in which balance is desired to be achieved.

Note that aircraft 10A is not required to include any flow conditioning plates 35.

Embodiment 3

Hereinafter aircraft 10B according to Embodiment 3 will be described. Aircraft 10B according to Embodiment 3 is achieved by rearranging rotor units 30 in aircraft 10 according to Embodiment 1.

Figure 10:
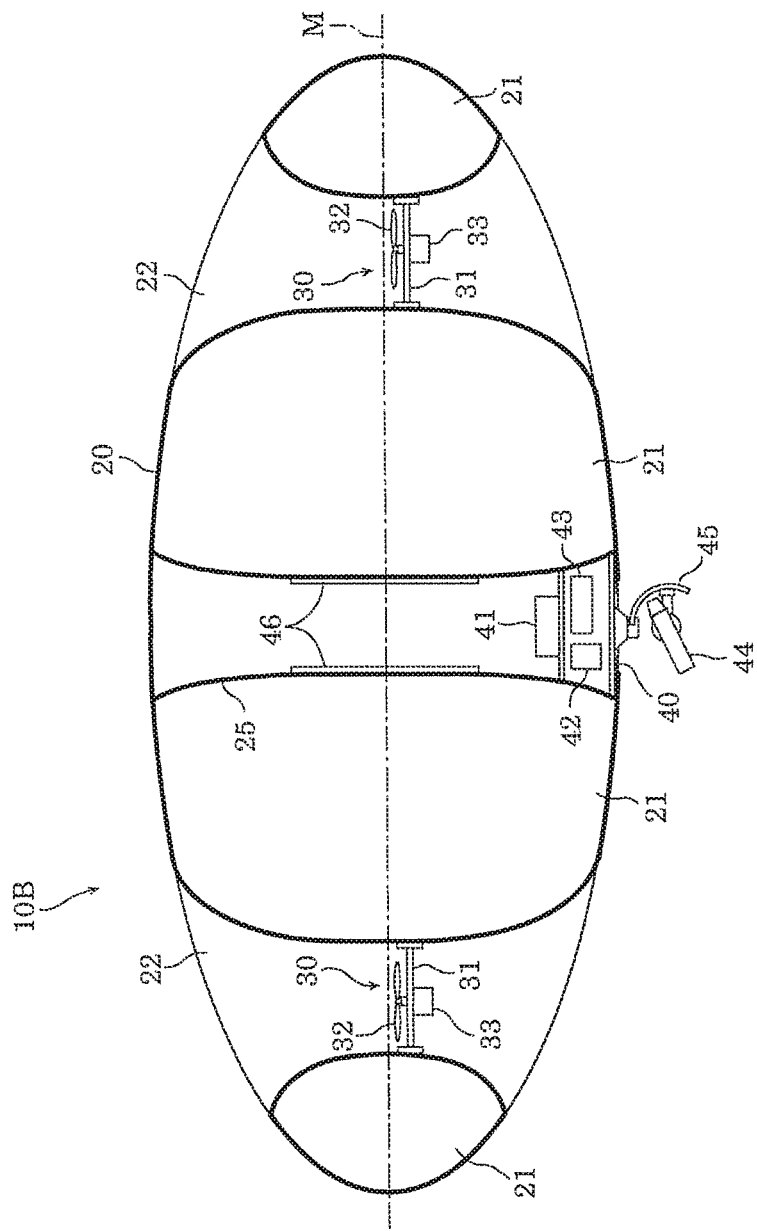
FIG. 10 is a cross sectional view of an aircraft according to Embodiment 3 and corresponds to FIG. 3.

FIG. 10 is a cross sectional view of the aircraft according to Embodiment 3 and corresponds to FIG. 3.

As illustrated in FIG. 10, rotor units 30 equipped in aircraft 10B according to Embodiment 3 are disposed below center plane M passing through the vertical center of balloon 20. Stated differently, the entirety of each rotor unit 30 is disposed below center plane M of balloon 20. In this way, rotor unit 30 may be disposed in each ventilation hole 22 of aircraft 10B in a region ranging from center plane M of balloon 20 to the bottom end of ventilation hole 22.

Embodiment 4

Hereinafter aircraft 10C according to Embodiment 4 will be described. Aircraft 10C according to Embodiment 4 is achieved by changing out balloon 20 in aircraft 10 according to Embodiment 1 for balloon 20A.

Figure 11:
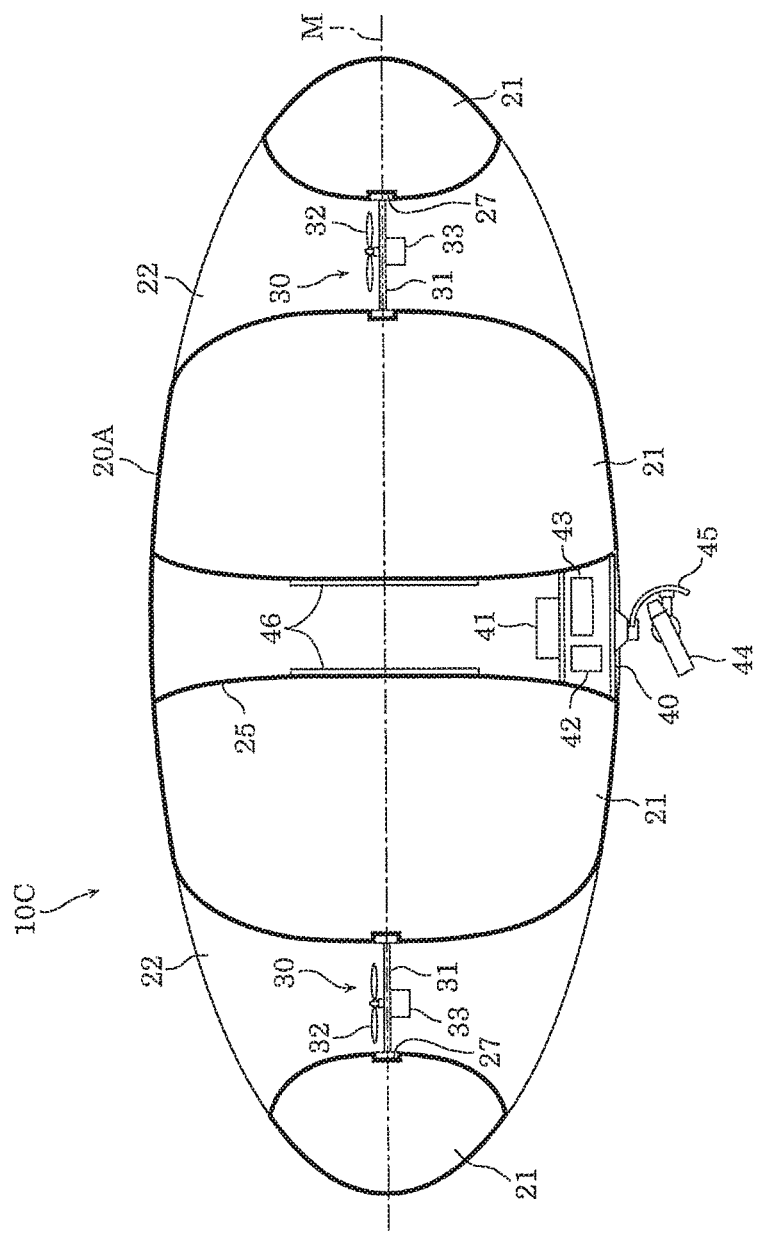
FIG. 11 is a cross sectional view of an aircraft according to Embodiment 4 and corresponds to FIG. 3.

FIG. 11 is a cross sectional view of the aircraft according to Embodiment 4 and corresponds to FIG. 3.

As illustrated in FIG. 1.1, balloon 20A according to Embodiment 4 includes indentations 27 for installation of rotor units 30 in sections forming ventilation holes 22. Indentations 27 are indentations formed in sections of balloon 20A forming ventilation holes 22. A single indentation 27 is formed in each ventilation hole 22. Moreover, indentation 27 is located around the entire perimeter of ventilation hole 22 where rotor unit 30 is attached (in Embodiment 4, indentation 27 is located in the vertical central region of ventilation hole 22).

The outer peripheral portion of frame 31 of rotor unit 30 fits into indentation 27 of balloon 20. As such, rotor unit 30 can easily be positioned when attaching rotor unit 30 to balloon 20. Stated differently, indentation 27 acts as a guide for attaching rotor unit 30 to balloon 20. Moreover, indentation 27 is as deep as frame 31 of rotor unit 30 is thick, which allows frame 31 to sit flush with the surface defining ventilation hole 22 in indentation 27. This allows for air to flow smoothly through ventilation hole 22.

Embodiment 5

Hereinafter the aircraft according to Embodiment 5 will be described. The aircraft according to Embodiment 5 differs from aircraft 10 according to Embodiment 1 in that the aircraft according to Embodiment 5 includes balloon 20B whose ventilation holes 22 differ in shape from ventilation holes 22 of balloon 20.

Figure 12:
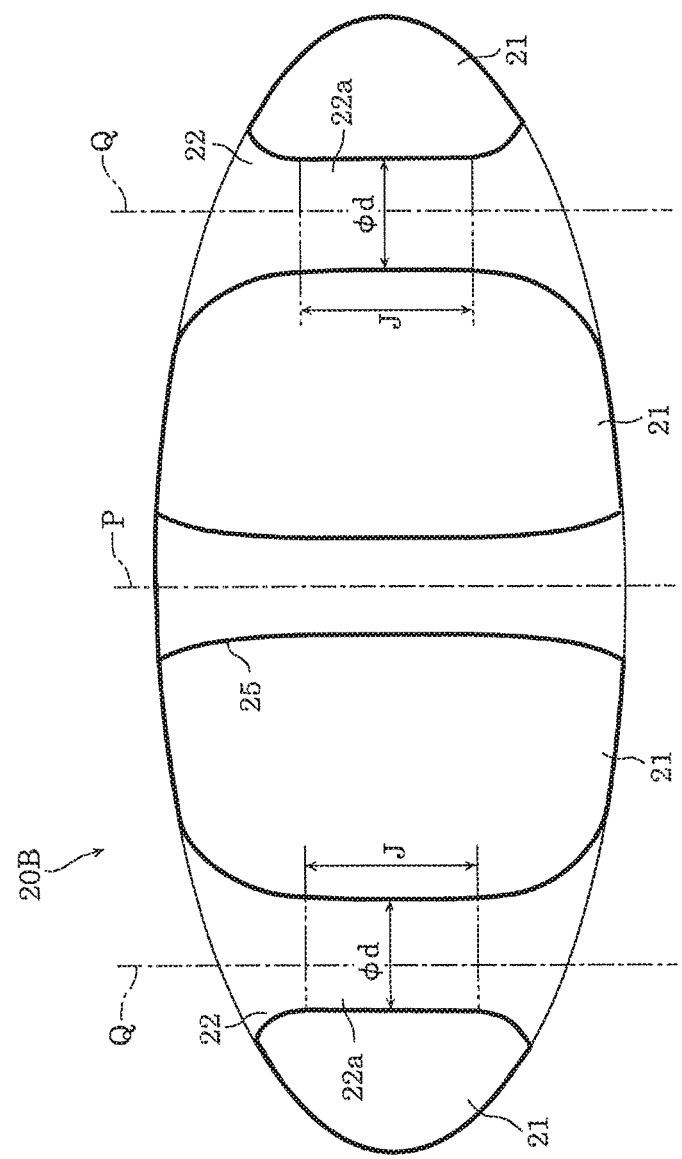
FIG. 12 is a cross sectional view of a balloon included in an aircraft according to Embodiment 5, and corresponds to FIG. 6.

FIG. 12 is a cross sectional view of the balloon included in the aircraft according to Embodiment 5, and corresponds to FIG. 6.

As illustrated in FIG. 12 in balloon 20B according to Embodiment 5, the vertical central region of each ventilation hole 22 is configured of center tubular section 22a having a constant diameter throughout its length. Center tubular section 22a has a length J and a diameter φd. Ventilation hole 22 according to Embodiment 5 gradually increases in cross sectional area from the top end of center tubular section 22a toward the top end of ventilation hole 22, and gradually increases in cross sectional area from the bottom end of center tubular section 22a toward the bottom end of ventilation hole 22. With the aircraft according to Embodiment 5, rotor unit 30 is disposed in the vertical central region of center tubular section 22a of balloon 20B.

Embodiment 6

Hereinafter the aircraft according to Embodiment 6 will be described. The aircraft according to Embodiment 5 is achieved by changing out balloon 20 in aircraft 10 according to Embodiment 1 for balloon 20C.

Figure 13:
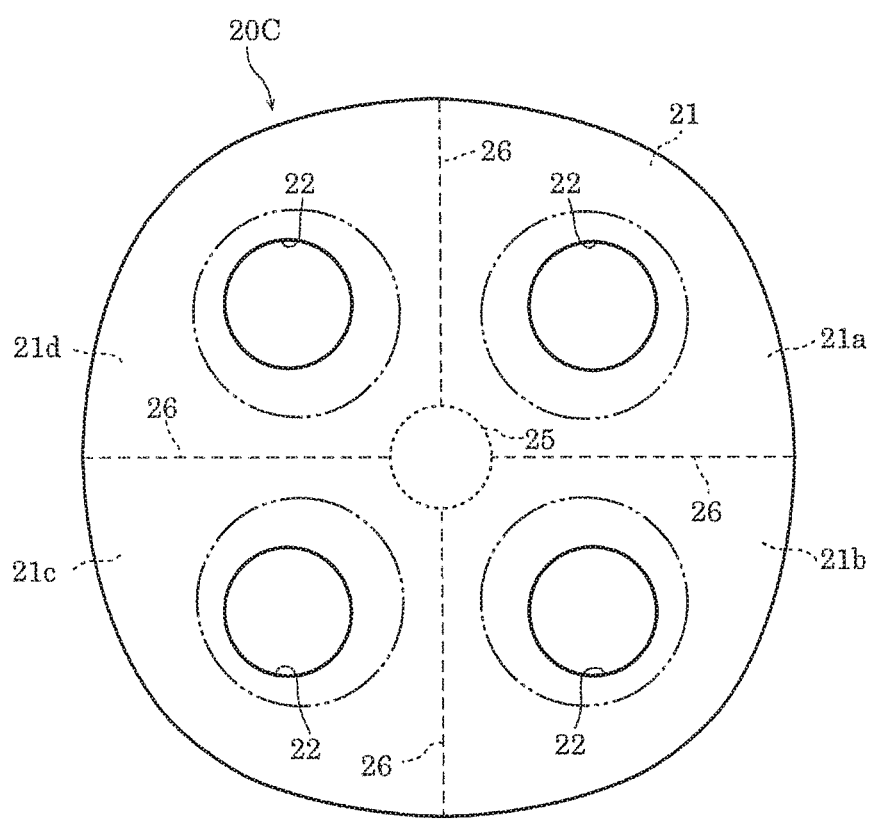
FIG. 13 is a plan view of a balloon included in an aircraft according Embodiment 6.

FIG. 13 is a plan view of the balloon included in the aircraft according to Embodiment 6.

As illustrated in FIG. 13, balloon 20C according to Embodiment 6 is balloon 20 according to Embodiment 1 further including bulkhead 26 that partitions gas chamber 21 of into a plurality of regions. Bulkhead 26 according to Embodiment 6 extends vertically across gas chamber 21 to partition gas chamber 21 into four regions—region 21a, region 21b, region 21c, and region 21d.

Regions 21a through 21d of gas chamber 21 partitioned by bulkhead 26 are independent spaces not in communication with one another. As such, even if balloon 20C were to rupture and gas from one region, for example region 21a, were to leak out, the remaining regions 21b through 21d would still hold gas. Thus, even if balloon 20C were to rupture, balloon 20C would remain afloat by the buoyant three exerted by the gas remaining in balloon 20C, making it possible to prevent the aircraft from suddenly falling to the ground.

Note that the number of regions 21a through 21d illustrated in FIG. 13 is just one example. Moreover, the shape of bulkhead 26 illustrated in FIG. 13 is just one example as well. For example, bulkhead 26 may extend horizontally to partition gas chamber 21 into vertical chambers, and may surround the perimeter of the tubular connector 25 in a curved shape to partition gas chamber 21 in a circumferential manner. Moreover, bulkhead 26 may form a compact balloon housed within gas chamber 21. Moreover, regions 21a through 21d may be filled with different gases. For example, regions 21a and 21c may be filled with helium, and regions 21b and 21d may be filled with air. This makes it possible to reduce the amount of costly helium used.

Embodiment 7

Hereinafter aircraft 10D according to Embodiment 7 will be described. Aircraft 10D according to Embodiment 7 mainly differs from aircraft 10A according to Embodiment 2 in that it further includes fixing component 50 and uses balloon 20D which has a different structural configuration than balloon 20 according to Embodiment 2. Hereinafter description will focus on the differences from aircraft 10A according to Embodiment 2.

Figure 14:
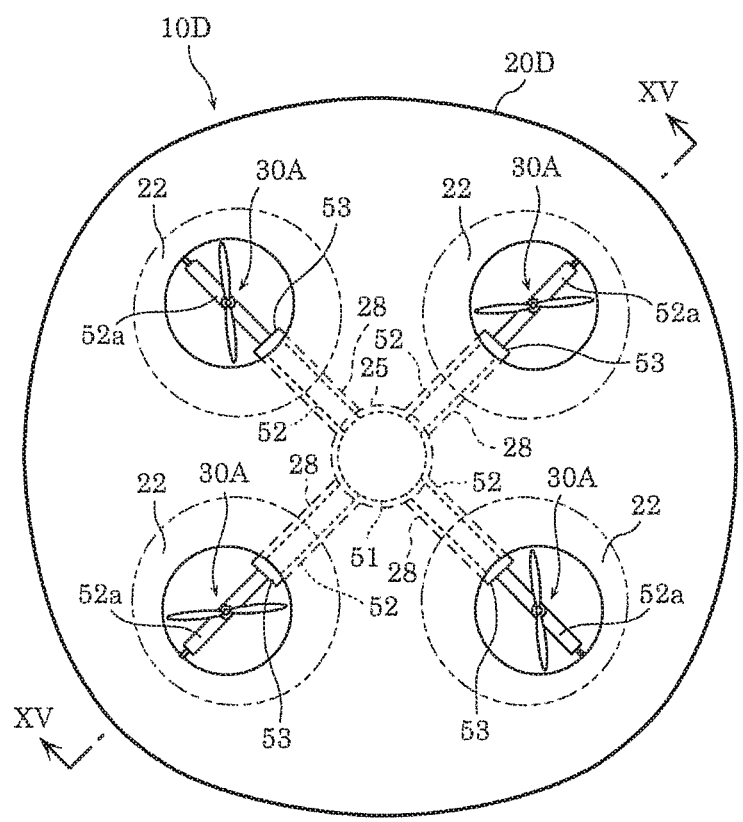
FIG. 14 is a plan view of an aircraft according to Embodiment 7.
Figure 15:
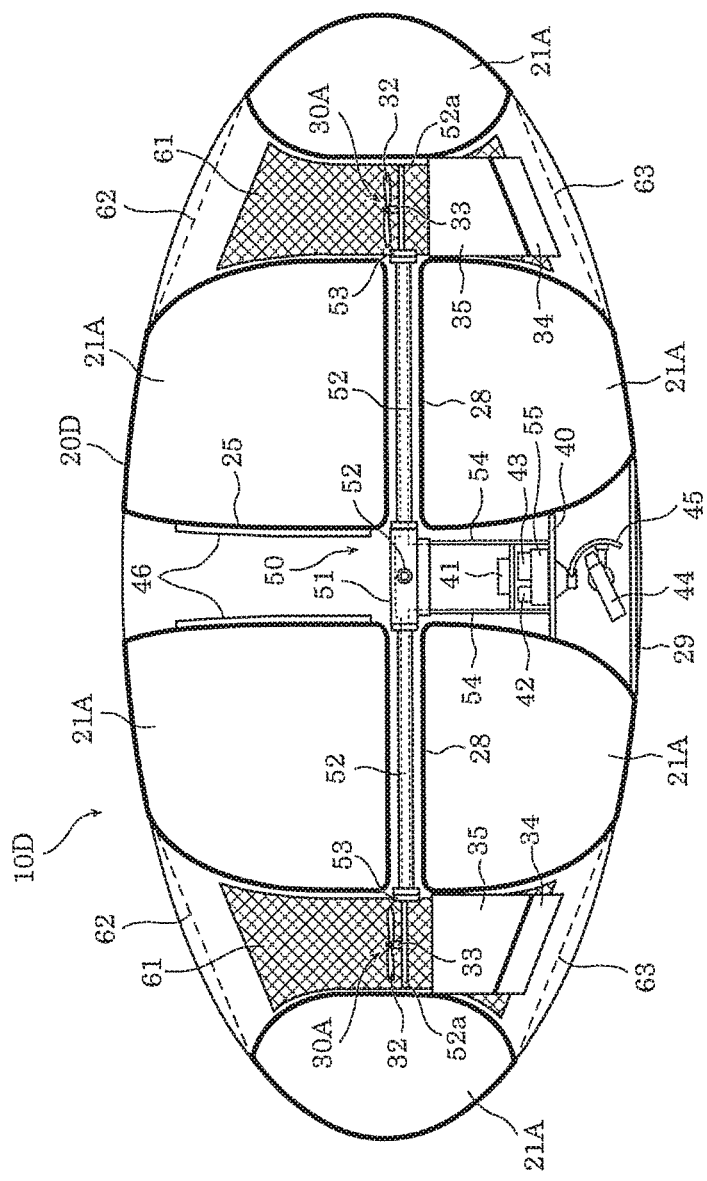
FIG. 15 is a cross sectional view of the aircraft taken at line XV-XV in FIG. 14.

FIG. 14 is a plan view of the aircraft according to Embodiment 7. FIG. 15 is a cross sectional view of the aircraft according to Embodiment 7 and corresponds to FIG. 3.

As illustrated in FIG. 14 and FIG. 15, aircraft 10 according to Embodiment 7 includes fixing component 50.

Fixing component 50 fixes each of the plurality of rotor units 30A in a predetermined position in a top view and in an orientation in which an axis of rotation of rotor unit 30A is approximately vertical. Specifically, fixing component 50 includes main body 51, four arms 52, and two support components 54.

Main body 51 is disposed in the space inside connector 25, and has the shape of a hollow cylinder with a base at its top end. Stated differently, main body 51 has a hollow therein.

The four arms 52 are tubular components fixed to the sides of main body 51, and extend from the sides of main body 51 in four different directions. Here, the four different directions are the directions from the space inside connector 25 toward ventilation holes 22.

The four arms 52 include distal ends 52a that fix the four rotor units 30A in orientations in which axes of rotation of the rotor units 30A are approximately vertical. More specifically, the lower part of motor 33 of rotor unit 30A is fixed to distal end 52a.

The two support components 54 are fixed to the bottom of main body 51 and extend downward from main body 51. Disk 40, which supports the onboard devices, is attached to the bottom of the two support components 54. The two support components 54 support; disk 40 in a location such that; camera 44 fixed to disk 40 is housed in a space within connector 25.

Note that main body 51 includes through-holes at points where the four arms 52 are fixed to main body 51, and the through-holes are communicatively connected to spaces inside the four arms 52. These through-holes allow the space inside main body 51 and the space inside the four arms 52 to be in communication with one another. Electrical cabling (not shown in the drawings) for supplying power to rotor units 30A from battery 42 runs through the spaces inside the four arms 52. In other words, the four arms 52 also function as conduit for housing electrical cabling.

In addition to the onboard devices, disk 40 also supports container 55 that accommodates a weight. Stated differently, aircraft 10D includes container 55. Container 55 is box-shaped and defines a space in which a metal weight (such as a lead, copper, or alloy weight) can be housed. Note that the weight is not limited to a metal weight; a non-metal weight (such as sand) is also acceptable. The weights may be provided in predetermined units of weight (for example 1 gram to 10 gram units) to adjust the gross weight of aircraft 10D.

Since balloon 20D is made of an elastic material, determining the amount of gas required to fill gas chamber 21A (i.e., determining the volumetric capacity of gas chamber 21A) is difficult. As such, until gas chamber 21A of balloon 20D is filled with gas, estimating the exact amount of buoyant force that will be exerted by the gas is difficult.

Thus, by providing container 55, after gas chamber 21A of balloon 20D is filled with gas, weights can be added to or removed from container 55 to adjust the gross weight of aircraft 10D. As a result, as described in Embodiment 1, the gross weight of aircraft 10D can be adjusted such that the buoyant force of the gas filling balloon 20D is slightly less than the gross weight of aircraft 10D. Note that the amount of buoyant force exerted by the gas filling balloon 20D is set to be consistently greater than the gross weight of aircraft 10D in a state in which no weights are in container 55 even if there are inconsistencies in the volumetric capacities of gas chamber 21A in balloon 20D.

Although not specifically described in Embodiments 1 through 6, note that aircrafts 10 and 10A through 10C according to Embodiments 1 through 6 may also include container 55.

Moreover, the four arms 52 each include voltage regulator 53. Each voltage regulator 53 is an amp that regulates the voltage of the power for driving motor 33 included in rotor unit 30A disposed near a corresponding one of arms 52. The plurality of voltage regulators 53 are each disposed in a different one of the plurality of ventilation holes 22.

Balloon 20D includes ducts 28 to connect ventilation holes 22. More specifically, ducts 28 communicatively connect ventilation holes 22 with the space inside coupling component 25 located in the central region of balloon 20D in a top view. Each arm 52 of fixing component 50 is disposed inside a different duct 28. In other words, ducts 28 are spaces for housing arms 52. Fixing component 50 may be supported by balloon 20D from pressure from gas chamber 21A being imparted on arms 52 in ducts 28, and main body 51 may be fixed in a predetermined position in coupling component 25.

Moreover, balloon 20D includes window 29 in the lower region of coupling component 25. Window 29 is made of a transparent resin such as acrylic so camera 44 can photograph below balloon 20D. Moreover, window 29 may simply be an opening.

Tubular components 61 are each disposed in a different one of ventilation holes 22 of balloon 20D. Each tubular component 61 supports the surface defining ventilation hole 22 from inside ventilation hole 22 to prevent the path of air flow in ventilation hole 22 from narrowing. Tubular component 61 is, for example, metal wire mesh. Tubular component 61 is not limited to metal such as metal wire, and may be made of any material that allows it to support the surface defining ventilation hole 22 in an outward direction without blocking the flow of air, such as resin. Moreover, tubular component 61 is not required to be formed into a mesh, and may be sheet shaped into a hollow cylinder. Note that arms 52 pass through tubular component 61.

Moreover, protective nets 62 and 63 are provided at the top and bottom portions of ventilation holes 22 of balloon 20D to inhibit contact with rotor units 30A disposed inside ventilation holes 22 in the event that an object contacts the top or bottom portion of ventilation holes 22.

Unlike rotor units 30 according to Embodiment 1, since rotor units 30A are supported by fixing component 50 and tubular components 61, frame 31 may be omitted from the configuration.

Advantageous Effects of Embodiment 7

In aircraft 10D according to Embodiment 7, fixing component 50 fixes each of the plurality of rotor units 30A in a predetermined position in a top view and in an orientation in which an axis of rotation of rotor unit 30A is approximately vertical. Balloon 20D includes ducts 28 in communication with the plurality of ventilation holes 22, and arms 52 of fixing component 50 are disposed inside ducts 28. As such, with fixing component 50, since rotor units 30A are fixed so as to be in predetermined positions relative to one another, and orientations of rotor units 30A are fixed such that their axes of rotation are approximately vertical, even if balloon 20D were to contact an object and balloon 20D were to be damaged, the relative positions and orientations of rotor units 30A would remain the same as before balloon 20D was damaged. As such, even if balloon 20D were to contact and be damaged by an object, it would still be possible to stably fly aircraft 10D.

Here, voltage regulators 53 are electrical parts that change the voltage of power from battery 42 to a voltage appropriate for motor 33, and as such, easily produce heat. However, since balloon 20D is made of a heat sensitive material, there is concern that balloon 20D may melt due to heat-generating parts.

With aircraft 10D according to Embodiment 7, since voltage regulators 53, which easily produce heat, are disposed in ventilation holes 22 through which air flows from rotor units 30A, voltage regulators 53 can be efficiently cooled by the air flow. Thus, damage resulting from balloon 20D melting from the heat from voltage regulators 53 and leakage of gas filling gas chamber 21A can be reduced.

Although not specifically described in Embodiment 1 through 6, note that aircrafts 10 and 10A through 10C according to Embodiments 1 through 6 (i.e., aircrafts 10 and 10A through 10C which do not include fixing component 50) include a voltage regulator for each rotor unit 30. Thus, aircrafts 10 and 10A through 10C also have the same above-described problem as aircraft 10D according to Embodiment 7. Therefore, similar to aircraft 10D according to Embodiment 7, disposing the voltage regulators in ventilation holes 22 of aircrafts 10 and 10A through 10C according to Embodiments 1 through 6 can be said to provide the same advantageous effect described above.

Since aircraft 10D according to Embodiment 7 includes tubular component 61 disposed in each ventilation hole 22, and tubular components 61 supports surfaces defining ventilation holes 22 to prevent ventilation holes 22 from narrowing, ventilation holes 22 can be easily maintained to have a desired shape. This makes it possible to achieve a desired air flow via rotor units 30A and stably fly aircraft 10D.

With aircraft 10D according to Embodiment 7, the top and bottom of coupling component 25 are covered, and protective nets 62 and 63 are provided at the top and bottom of ventilation holes 22. Stated differently, since rotor units 30A, fixing component 50, and the onboard devices are covered by balloon 20D and protective nets 62 and 63, even if aircraft 10D were to crash into an object, balloon 20D and protective nets 62 and 63 would mitigate the impact. As such, damage to rotor units 30A, fixing component 50, and the onboard devices as well as damage to the object itself can be effectively reduced.

Other Embodiments

As described, above, techniques of the present disclosure have been described by way of example via embodiments. However, techniques of the present disclosure are not limited to the above embodiments; the techniques are applicable to embodiments resulting from various modifications, permutations, additions and omissions to and in the above embodiments.

Examples of such other embodiments will be described hereinafter.

In Embodiments 1 through 7 described above, aircrafts 10 and 10A through 10D include a shock absorber configured of a hollow balloon 20 or balloon 20A through 20D, but the shock absorber is not limited to this example. For example, the shock absorber may be configured of a solid material such as a sponge-like material or rubber. In other words, the shock absorber may be made of any material so long as the shock absorber can absorb an impact in the event crashing into an object.

Figure 16:
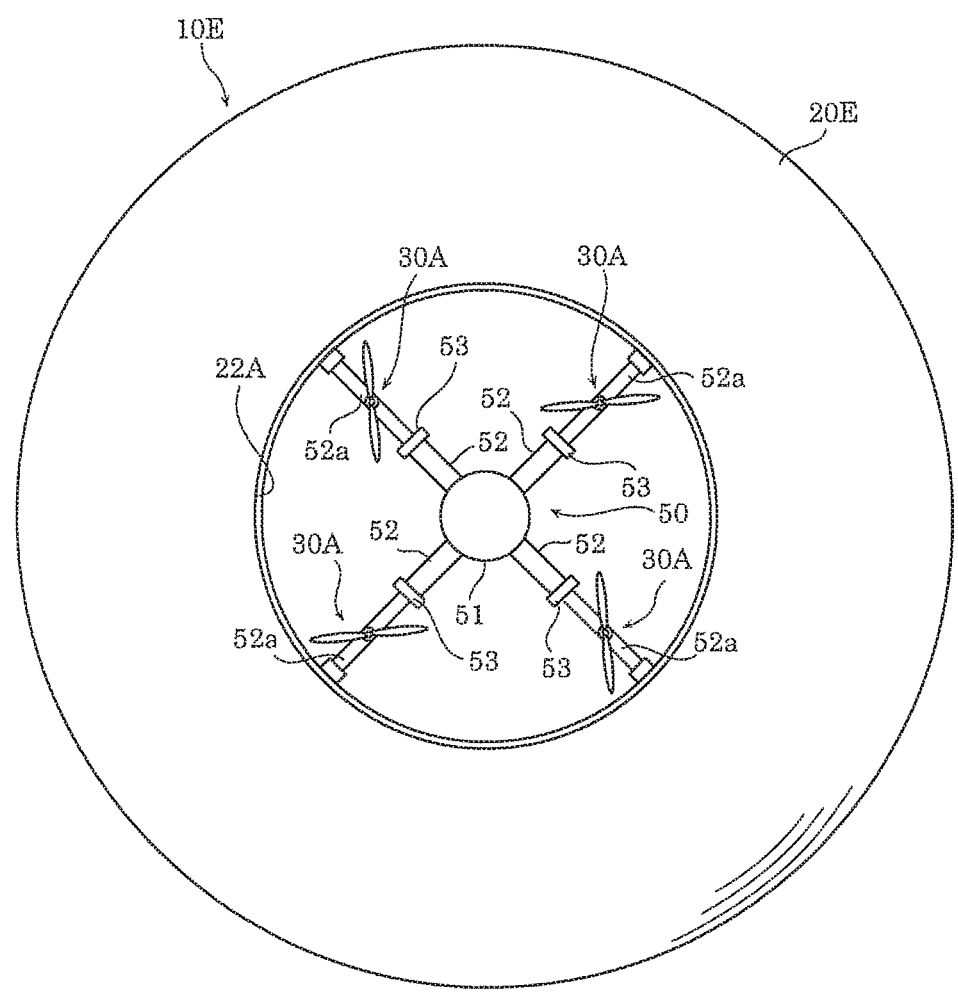
FIG. 16 is a plan view of an aircraft according to another embodiment.

In Embodiments 1 through 7 described above, balloons 20 and 20A through 20D of aircrafts 10 and 10A through 10D include four ventilation holes 22, and rotor unit 30 or 30A is disposed in each of the four ventilation holes 22, but this configuration is merely an example. For example, as illustrated in FIG. 16, aircraft 10E including (i) balloon 20E defining a single ventilation hole 22E and (ii) fixing component 50A including four rotor units 30A disposed inside the single ventilation hole 22E is acceptable. Note that FIG. 16 is a plan view of an aircraft according to another embodiment.

Moreover, although not illustrated in the drawings, an aircraft including (i) a balloon defining two ventilation holes and (ii) two rotor units disposed in each of the two ventilation holes is also acceptable. Stated differently, an aircraft in which a plurality of rotor units are disposed in a single ventilation hole is acceptable.

Figure 17:
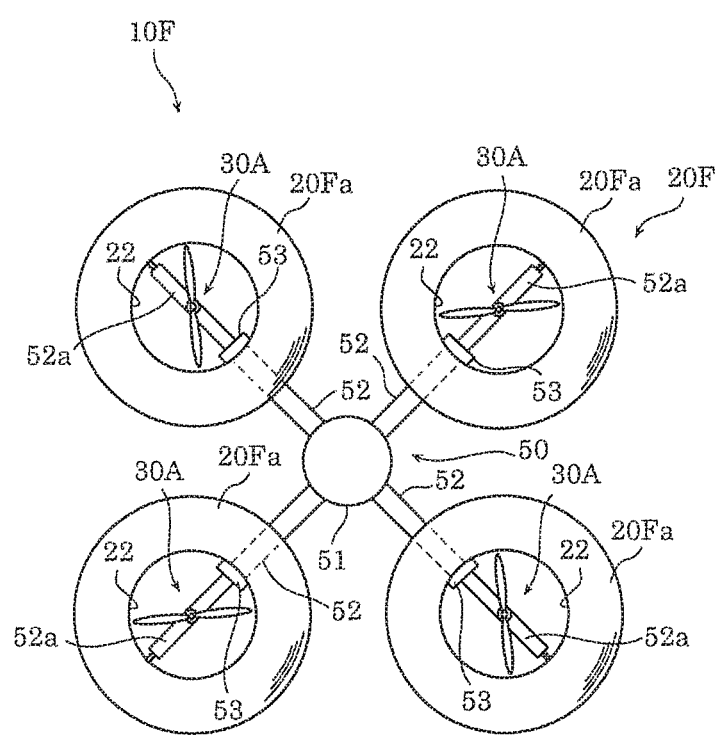
FIG. 17 is a plan view of an aircraft according to another embodiment.

In Embodiments 1 through 7 described above and FIG. 16 illustrating another embodiment, aircrafts 10 and 10A through 10D include a single balloon. 20 or balloon 20A through 20E, but the balloon is not limited to this example. For example, as illustrated in FIG. 17, balloon 20F including a plurality of (four) separate sub-balloons 20Fa (i.e., sub-shock absorbers) may be used. Note that FIG. 17 is a plan view of an aircraft according to another embodiment. Each of the sub-balloons 20Fa defines a single ventilation hole 22 in which a single rotor unit 30A is disposed. Rotor units 30A disposed in ventilation holes 22 defined by the plurality of sub-balloons 20Fa are fixed together by fixing component 50.

Figure 18:
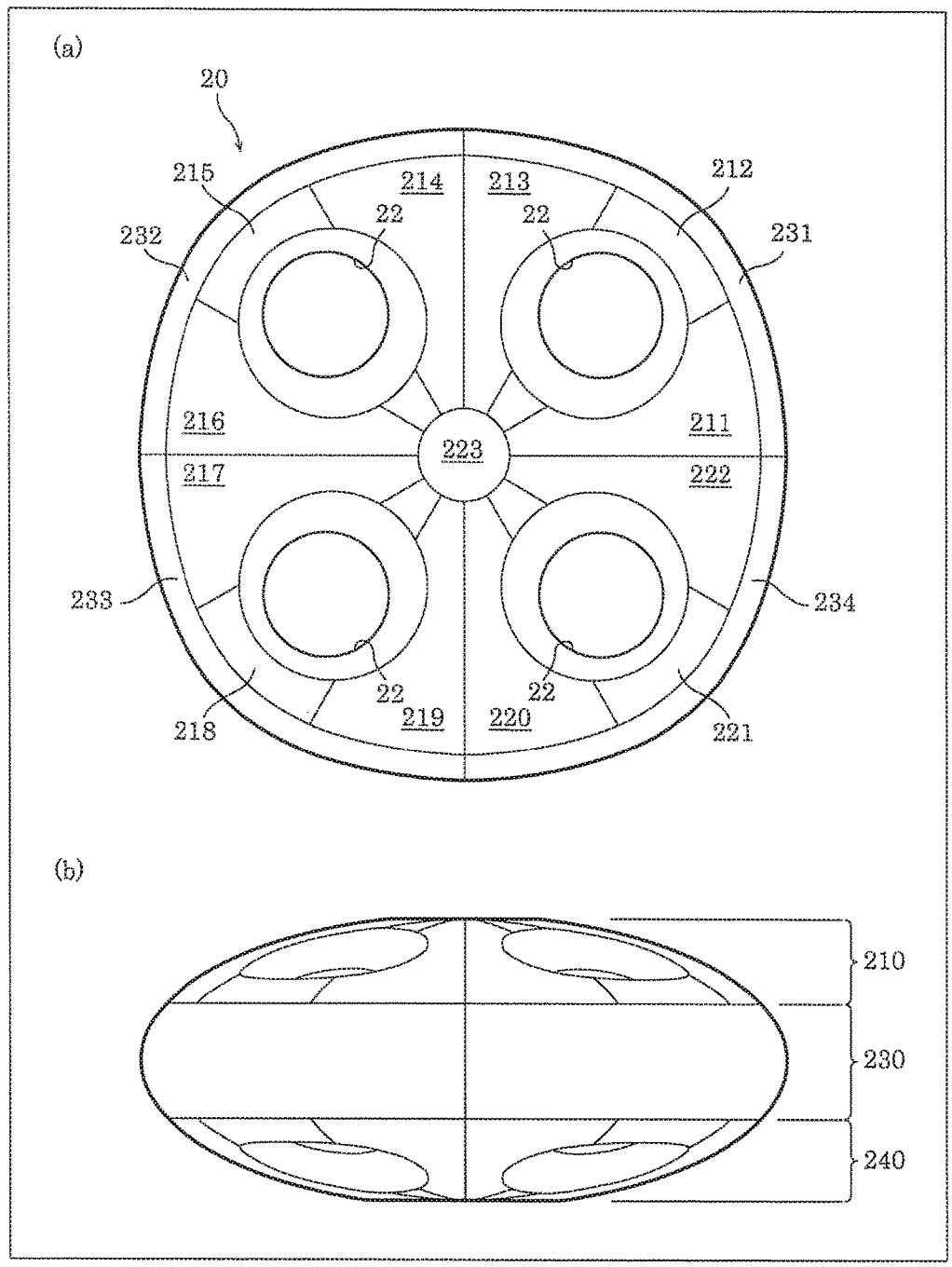
FIG. 18 illustrates the configuration of a balloon sheet.

In Embodiments 1 through 7, balloons 20 and 20A through 20D of aircrafts 10 and 10A through 10D may be configured as illustrated in FIG. 18. FIG. 18 illustrates a configuration of a balloon sheet. More specifically, (a) in FIG. 18 is a plan view of balloons 20 and 20A through 20D, (b) in FIG. 18 is a front view from a side of balloons 20 and 20A through 20D.

As illustrated in (b) in FIG. 18, balloons 20 and 20A through 20D includes top sheet 210, bottom sheet 240, and side sheet 230.

Top sheet 210 forms the top of balloons 20 and 20A through 20D. Bottom sheet 240 forms the bottom of balloons 20 and 20A through 20D. As illustrated in (a) in FIG. 18, top sheet 210 includes a plurality of substantially fan-shaped sub-sheets 211 through 222 adhered together at their radial edges to form a sheet whose outer diameter is an approximate circle. Top sheet 210 is an approximately circular sheet including reference curve sections 23 and small curvature radius sections 24 described in Embodiment 1. Moreover, a circular sub-sheet 223 is disposed the center of top sheet 210, and the tips of the plurality of sub-sheets 211 through 222 are connected to sub-sheet 223. Note that the apex angles of sub-sheets 211 through 222 of top sheet 210 preferably totals less than 360 degrees, as this gives top sheet 210 an approximately conical shape.

Although bottom sheet 240 is not illustrated in detail in the drawings, bottom sheet 240 has the same configuration as top sheet 210, so description thereof is omitted.

Note that top sheet 210 and bottom sheet 240 each include an opening for forming the four ventilation holes 22, and connecting together the openings in top sheet 210 and bottom sheet 240 forms ventilation holes 22.

Side sheet 230 forms the side of balloons 20 and 20A through 20D. Side sheet 230 is configured of rectangular sheet of a plurality of sub-sheets 231 through 234 adhered together at their short ends. Note that the side sheet may be configured of a single rectangular sheet.

One of the two opposing long edges of side sheet 230 is adhered to the peripheral edge of top sheet 210, and the second of the two opposing long edges of side sheet 230 is adhered to the peripheral edge of bottom sheet 240.

In this way, by configuring balloons 20 and 20A though 20D from top sheet 210, bottom sheet 240, and side sheet 230, the side portions balloons 20 and 20A through 20D include relatively long portions without sections where edges are adhered. Stated differently, by configuring the majority of the side portion of sub-sheets 231 through 234, displays such as advertisements can be printed on the side portion without, for the most part, misalignment or miscoloring arising from adhering the displays. With this, advertisements can be displayed on the side of balloons 20 and 20A through 20D while preserving aesthetics.

In Embodiments 1 through 6, the upper end of coupling component 25 of aircrafts 10 and 10A through 10C is closed off, but the upper end may be open to the outside. With this, since the space inside coupling component 25 is open to the outside at both the top and bottom ends, air can more freely flow through the space inside coupling component 25. For this reason, onboard devices disposed in the space inside coupling component 25 can be effectively cooled. Note that in this case, when disk 40 includes a plurality of through-holes or cut-aways to further improve air flow, air can flow through the space inside coupling component 25 even more freely, thereby cooling the onboard devices even more effectively.

In the above Embodiments 1 through 7 and the other embodiments illustrated in FIG. 16 and FIG. 17, aircraft 10 and 10A through 10F include four rotor units 30, but aircraft 10 and 10A through 10F may include two or more rotor units 30; the number of rotor units 30 is not limited to four. However, from the perspective of stabilizing the flight of aircraft 10, aircraft 10 preferably includes three or more rotor units 30.

As described above, balloon 20 of aircraft 10 includes as many ventilation holes 22 as there are rotor units 30. Thus, in aircraft 10 including N (N being an integer greater than 1) rotor units 30, N ventilation holes 22 are defined by balloon 20. In this case, the shape of balloon 20 preferably has rotational symmetry about a vertically extending line (360 degrees/N). Stated differently, in this case, balloon 20 has the same shape after each rotation of (360 degrees/N) about the axis of symmetry. For example, when aircraft 10 includes three rotor units 30, balloon 20 of aircraft 10 preferably has rotational symmetry such that the shape of balloon 20 is the same after each rotation of 120 degrees about the axis of symmetry. Likewise, when aircraft 10 includes six rotor units 30, balloon 20 of aircraft 10 preferably has rotational symmetry such that the shape of balloon 20 is the same after each rotation of 60 degrees about the axis of symmetry.

In the above Embodiments 1 through 7 and the other embodiments illustrated in FIG. 16 and FIG. 17, aircraft 10 and 10A through 10F may be configured such that rotor units 30 are attachable and detachable to and from balloon 20. When rotor units 30 are attachable and detachable to and from balloon 20, rotor units 30 can be detached from balloon 20 and balloon 20 can be folded compactly when transporting aircraft 10. This allows for the transportation packaging for aircraft 10 to be compact.

In the above Embodiments 1 through 7 and the other embodiments illustrated in FIG. 16 and FIG. 17, balloon 20, 20A through 20D, and 20F includes the same number of ventilation holes 22 as rotor units 30 (four in Embodiments 1 through 7), and a single rotor unit 30 or 30A is disposed in each ventilation hole 22. However, balloon 20 may include more ventilation holes 22 than rotor units 30. In this case, there will be at least one ventilation hole 22 in which rotor unit 30 is not disposed. When balloon 20 includes ventilation hole 22 in which rotor unit 30 is not disposed, air resistance acting on aircraft 10 during ascent and descent of aircraft 10 can be reduced.

In the above Embodiment 1 through 6, a protective net stretching horizontally across ventilation hole 22 may be provided in each ventilation hole 22 of balloon 20. In this case, in each ventilation hole 22, protective nets may be disposed above and below rotor unit 30. These protective nets are provided in ventilation hole 22 to prevent foreign objects from entering ventilation hole 22 and contacting propeller 32 of rotor unit 30.

Note that in an aircraft including the protective nets, the ventilation holes of the aircraft may be of such a height that the protective net will not contact the rotor unit even if the balloon and the protective net deform as a result of contact from outside. With this, even if an object contacts the protective net, contact between the object and the rotor unit can be reduced.

In the above Embodiments 1 through 7 and the other embodiments illustrated in FIG. 16 and FIG. 17, in aircraft 10 and 10A through 10F, camera 44, projector 43, and luminous body 46 are optional components and may be omitted. These components are irrelevant to the functional capabilities of aircraft 10 itself.

In the above Embodiments 1 through 7 and the other embodiments illustrated in FIG. 16 and FIG. 17, aircraft 10 and 10A through 10F may include a speaker along with, for example, controller 41. When aircraft 10 includes a speaker, sound can be emitted from the speaker and the sheet forming balloon 20 can be vibrated with sound waves to achieve a dramatic effect.

As the above, the non-limiting embodiment has been described by way of example of the technology of the present disclosure. To this extent, the accompanying drawings and detailed description are provided.

Thus, the components set forth in the accompanying drawings and detailed description include not only components essential to solve the problems but also components unnecessary to solve the problems for the purpose of illustrating the above non-limiting embodiment. Thus, those unnecessary components should not be deemed essential due to the mere fact that they are described in the accompanying drawings and the detailed description.

The above non-limiting embodiments illustrate the techniques of the present disclosure, and thus various modifications, permutations, additions and omissions are possible within the scope of the appended claims and the equivalents thereof.

Although only some exemplary embodiments of the present disclosure have been described in detail above, those skilled, in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

As described above, the present disclosure is applicable to aircraft including a plurality of rotor units and a balloon.

What is claimed is:

1. An aircraft, comprising:
a plurality of rotor units each including a propeller and a motor that drives the propeller; and
a shock absorber covering an entire vertical length of a lateral side of the plurality of rotor units,
wherein the shock absorber defines a plurality of ventilation holes vertically passing through the shock absorber, and each of the plurality of rotor units is disposed in a different one of the plurality of ventilation holes,
the shock absorber comprises a balloon containing gas,
the aircraft further comprising an inner space provided in a central region of the balloon, wherein at least one end of the inner space is connected to a top portion or a bottom portion of the balloon, and
the inner space is disposed between two of the plurality of ventilation holes in which the plurality of rotor units are disposed, and at least one end of the inner space is open such that the inner space is exposed to space external to the balloon.

2. The aircraft according to claim 1, further comprising a plurality of voltage regulators each of which is disposed in a different one of the plurality of ventilation holes, wherein each of the plurality of voltage regulators regulates voltage of power driving the motor of a different one of the plurality of rotor units.

3. The aircraft according to claim 1, further comprising a plurality of tubular components each of which is disposed in a different one of the plurality of ventilation holes, the plurality of tubular components supporting surfaces of the shock absorber defining the plurality of ventilation holes to prevent the plurality of ventilation holes from narrowing.

4. The aircraft according to claim 1, further comprising a fixing component that fixes each of the plurality of rotor units in a predetermined position in a top view and in an orientation in which an axis of rotation of the rotor unit is approximately vertical, wherein the shock absorber includes a duct to connect the plurality of ventilation holes, and the fixing component is disposed inside the duct.

5. The aircraft according to claim 1, wherein
the balloon includes a top sheet, a bottom sheet, and a side sheet,
the top sheet and the bottom sheet each include a plurality of substantially fan-shaped sub-sheets adhered together at radial edges thereof,
the side sheet includes a rectangular sheet, and
one of two opposing long edges of the side sheet is adhered to a peripheral edge of the top sheet and another of the two opposing long edges of the side sheet is adhered to a peripheral edge of the bottom sheet.

6. The aircraft according to claim 1, wherein the plurality of rotor units and the plurality of ventilation holes in which the plurality of rotor units are disposed are located closer to a peripheral edge of the balloon than a central axis of the balloon.

7. The aircraft according to claim 1, wherein the balloon gradually decreases in height from a central region of the balloon toward a peripheral edge of the balloon.

8. The aircraft according to claim 1, wherein the connector is tubular in shape.

9. The aircraft according to claim 1, further comprising a plurality of rudders each of which is disposed in a lower region of a different one of the plurality of ventilation holes.

10. The aircraft according to claim 1, wherein, in a top view,
a peripheral edge of the balloon includes reference curve sections and small curvature radius sections having a smaller radius of curvature than the reference curve sections, the reference curve sections and the small curvature radius sections being alternately arranged around the peripheral edge and each being equal in number to the plurality of ventilation holes, and
each of the small curvature radius sections is disposed adjacent to a different one of the plurality of ventilation holes, in a more peripheral position than the ventilation hole it is disposed adjacent to.

11. The aircraft according to claim 1, wherein the balloon includes a plurality of indentations in portions defining the plurality of ventilation holes, the plurality of indentations being for placement of the plurality of rotor units.

12. The aircraft according to claim 1, wherein a space containing the gas inside the balloon is partitioned into a plurality of regions.

13. The aircraft according to claim 1, wherein the shock absorber comprises a plurality of sub-shock absorbers each of which includes a different one of the plurality of ventilation holes.

14. The aircraft according to claim 1, further comprising:
a controller for the plurality of rotor units,
wherein the controller is disposed in a lower portion of the inner space.

15. The aircraft according to claim 1, further comprising:
a battery that supplies power to the plurality of rotor units,
wherein the battery is disposed in a lower portion of the inner space.

16. The aircraft according to claim 1, wherein the gas is less dense than atmosphere.

17. The aircraft according to claim 16, further comprising a container that accommodates a weight for adjusting a gross weight of the aircraft.

18. The aircraft according to claim 1, wherein each of the plurality of ventilation holes has a shape that gradually expands in cross sectional area from a vertical central region toward a top end and a bottom end.

19. The aircraft according to claim 18, wherein the balloon gradually decreases in height from a central region of the balloon toward a peripheral edge of the balloon, and with respect to each of the plurality of ventilation holes, a height measured closer to the peripheral edge of the balloon is less than a height measured closer to the central region of the balloon.

* * * * *